US012619003B2

(12) United States Patent
Engheta et al.

(10) Patent No.: US 12,619,003 B2
(45) Date of Patent: May 5, 2026

(54) MULTISTABLE ELASTIC PIXEL (MEP)-BASED REVERSIBLY RECONFIGURABLE METASURFACES

(71) Applicant: The Trustees of the University of Pennsylvania, Philadelphia, PA (US)

(72) Inventors: Nader Engheta, Berwyn, PA (US); Kathleen J Stebe, Penn Valley, PA (US); Nasim Mohammadi Estakhri, Anaheim, CA (US); Tianyi Yao, Exton, PA (US); Jed-Joan Edziah, Newark, NJ (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 263 days.

(21) Appl. No.: 18/461,750

(22) Filed: Sep. 6, 2023

(65) Prior Publication Data

US 2024/0094438 A1      Mar. 21, 2024

Related U.S. Application Data

(60) Provisional application No. 63/380,622, filed on Oct. 24, 2022, provisional application No. 63/374,723, filed on Sep. 6, 2022.

(51) Int. Cl.
| | |
|---|---|
| *G02B 1/00* | (2006.01) |
| *B82Y 20/00* | (2011.01) |
| *G02F 1/137* | (2006.01) |

(52) U.S. Cl.
CPC .............. *G02B 1/002* (2013.01); *B82Y 20/00* (2013.01); *G02F 1/13756* (2021.01)

(58) Field of Classification Search
CPC ........ G02B 5/008; G02B 1/002; G02B 1/007; G02B 26/06; G02B 1/005; G02B 5/1809; G02F 1/292; G02F 2202/30
See application file for complete search history.

(56) References Cited

U.S. PATENT DOCUMENTS

2011/0085229 A1* 4/2011 Lavrentovich ............ G02F 1/29
                                                                        977/932
2018/0143470 A1* 5/2018 Oh .................... G02F 1/133703
(Continued)

OTHER PUBLICATIONS

Sautter et al., "Active tuning of all-dielectric metasurfaces", ACS nano, 2015, vol. 9, No. 4, pp. 4308-4315.
(Continued)

*Primary Examiner* — Jonathan Y Jung
(74) *Attorney, Agent, or Firm* — BakerHostetler

(57) ABSTRACT

Provided are new classes of reconfigurable, multistable metasurfaces using the physics of colloids confined within nematic liquid crystals (NLCs). The colloids are physically moved from one stable location to another as defined by NLC-colloid interactions by external switching fields. These colloids can be scatterers within reconfigurable metasurfaces with electromagnetic (EM) responses that change with colloid location. because the colloids are moved between stable loci, these metasurfaces are also multistable, and require energy input only when changing colloid position. Furthermore, because the colloids can be returned to their original positions by simply reversing the switching field, all changes in EM responses are entirely reversible. Also provided are reconfigurable, multistable metasurfaces that utilize colloids disposed within a field of protrusions extended from a surface, with interactions between the colloid and the protrusions and the application of external fields operating to move the colloids between stable states.

22 Claims, 22 Drawing Sheets
(15 of 22 Drawing Sheet(s) Filed in Color)

Switching field repositions colloid

Multistable Elastic Pixel (MEP)

State 1      External Field      State 2

Reconfigurable Metasurfaces

(56)                References Cited

U.S. PATENT DOCUMENTS

2019/0278112 A1*  9/2019  Caldwell ................. G02B 1/08
2020/0303827 A1*  9/2020  Akselrod ............. G01S 7/4817
2022/0187677 A1*  6/2022  Won ........................ G02F 1/294
2024/0310689 A1*  9/2024  Kyrou ................... G01S 7/4817

OTHER PUBLICATIONS

Sklan et al., "Thermal metamaterials: functions and prospects", National Science Review, 2018, vol. 5, No. 2, pp. 138-141.

Soref et al., "Allsilicon active and passive guided-wave components for A 1.3 and 1.6 pm", IEEE Journal of Quantum Electronics, 1986, vol. 22, No. 6, pp. 873-879.

Soref et al., "Electrooptical effects in silicon", IEEE journal of quantum electronics 1987, vol. QE-23, No. 1, pp. 123-129.

Sun et al., "High-efficiency broadband anomalous reflection by gradient meta-surfaces", Nano letters, 2012, vol. 12, No. 12, pp. 6223-6229.

Sussman et al., "Fast, scalable, and interactive software for Landau-de Gennes numerical modeling of nematic topological defects", Frontiers in Physics, 2019, vol. 7, Article 204, pp. 1-15.

Tatarkova et al., "Colloidal interactions and transport in nematic liquid crystals", Physical review letters, 2007, vol. 98, No. 157801, pp. 1-4.

Tran et al., "Lassoing saddle splay and the geometrical control of topological defects", Proceedings of the National Academy of Sciences, 2016, vol. 113, No. 26, pp. 7106-7111.

Urbas et al., "Roadmap on optical metamaterials", Journal of Optics, 2016, vol. 18, No. 093005, pp. 1-53.

Valentine et al., "Three-dimensional optical metamaterial with a negative refractive index", Nature, 2008, vol. 455, No. 7211, pp. 376-379.

Wang et al., "Optically reconfigurable metasurfaces and photonic devices based on phase change materials", Nature Photonics, 2016, vol. 10, No. 1, pp. 60-65.

Watts et al., "Metamaterial electromagnetic wave absorbers", Advanced materials 2012, vol. 24, No. 23, pp. OP98-OP120.

Watts et al., "Terahertz compressive imaging with metamaterial spatial light modulators", Nature Photonics, 2014, vol. 8, No. 8, pp. 605-609.

Yu et al., "Flat optics with designer metasurfaces", Nature materials, 2014, vol. 13, No. 2, pp. 139-150.

Yu et al., "High-transmission dielectric metasurface with 2n phase control at visible wavelengths", Laser & Photonics Reviews, 2015, vol. 9, No. 4, pp. 412-418.

Yu et al., "Light propagation with phase discontinuities: generalized laws of reflection and refraction", Science, 2011, vol. 334, No. 6054, pp. 333-337.

Zeng et al., "Ultrathin nanostructured metals for highly transmissive plasmonic subtractive color filters", Scientific reports, 2013, vol. 3, No. 2840, pp. 1-9.

Zhang et al., "Controlling light-with-light without nonlinearity", Light: Science & Applications, vol. 1, No. e18, pp. 1-5.

Zheng et al., "Metasurface holograms reaching 80% efficiency", Nature nanotechnology, 2015, vol. 10, No. 4, pp. 308-312.

Arbabi et al., "MEMS-tunable dielectric metasurface lens." Nature communications 2018, vol. 9, No. 1, pp. 1-9.

Beller et al., "Focal conic flower textures at curved interfaces", Physical Review X, 2013, vol. 3: 041026, pp. 1-8.

Boniello et al., "Colloids in confined liquid crystals: a plot twist in the lock-and-key mechanism", Soft matter, 2019, vol. 15, No. 26, pp. 5220-5226.

Buchnev et al., "Electro-optical control in a plasmonic metamaterial hybridised with a liquid-crystal cell", Optics express, 2013, vol. 21, No. 2, pp. 1633-1638.

Cavallaro et al., "Exploiting imperfections in the bulk to direct assembly of surface colloids", Proceedings of the National Academy of Sciences, 2013, vol. 110, No. 47, pp. 18804-18808.

Cavallaro et al., "Ring around the colloid", Soft Matter, 2013, vol. 9, No. 38, pp. 9099-9102.

Chen et al., "Realization of Fanolike resonance due to diffraction coupling of localized surface plasmon resonances in embedded nanoantenna arrays", Plasmonics, 2015, vol. 10, No. 2, pp. 341-346.

Cummer et al., "Controlling sound with acoustic metamaterials", Nature Reviews Materials, 2016, vol. 1, No. 3: 16001, pp. 1-13.

Decker et al., "Electro-optical switching by liquid-crystal controlled metasurfaces", Optics express, 2013, vol. 21, No. 7, pp. 8879-8885.

Ee et al., "Tunable metasurface and flat optical zoom lens on a stretchable substrate", Nano letters, 2016, vol. 16, No. 4, pp. 2818-2823.

Estakhri et al., "Recent progress in gradient metasurfaces", Josa B, 2016, vol. 33.2, pp. A21-A30.

Fang et al., "Sub-diffraction-limited optical imaging with a silver superlens", Science, 2005, vol. 308, No. 5721, pp. 534-537.

Feigenbaum et al., "Unity-order index change in transparent conducting oxides at visible frequencies", Nano letters, 2010, vol. 10, No. 6, pp. 2111-2116.

Ghanadzadeh-Gilani, "Dielectric and electro-optical properties of some cyanobiphenyl liquid-crystals", Diss. University of Aston in Birmingham, 1995, pp. 1-397.

Gharbi et al., "Elastocapillary driven assembly of particles at free-standing smectic-A films", Langmuir, 2018, vol. 34, No. 5, pp. 200 ••-2013.

Gharbi et al., "Microbullet assembly: Interactions of oriented dipoles in confined nematic liquid crystal", Liquid Crystals, 2013, vol. 40, No. 12, pp. 1619-1627.

Grady et al., "Terahertz metamaterials for linear polarization conversion and anomalous refraction", Science, 2013, vol. 340, No. 6138, pp. 1304-1307.

Greybush et al., "Plasmon resonances in self-assembled two-dimensional Au nanocrystal metamolecules" ACS nano, 2017, vol. 11, No. 3, pp. 2917-2927.

Honglawan et al., "Pillar-Assisted Epitaxial Assembly of Toric Focal Conic Domains of Smectic-A Liquid Crystals", Advanced Materials, 2011, vol. 23, No. 46, pp. 5519-5523.

Honglawan et al., "Synergistic assembly of nanoparticles in smectic liquid crystals", Soft Matter, 2013, vol. 11, No. 37, pp. 7367-7375.

Honglawan et al., "Topographically induced hierarchical assembly and geometrical transformation of focal conic domain arrays in smectic liquid crystals", Proceedings of the National Academy of Sciences, 2013, vol. 110, No. 1, pp. 34-39.

Kamali et al., "Highly tunable elastic dielectric metasurface lenses", Laser & Photonics Reviews, 2016, vol. 10, No. 6, pp. 1002-1008.

Knight et al., "Photodetection with active optical antennas", Science, 2011, vol. 332, No. 6030, pp. 702-704.

Komar et al., "Dynamic beam switching by liquid crystal tunable dielectric metasurfaces", ACS Photonics, 2018, vol. 5, No. 5, pp. 1742-1748.

Komar et al., "Electrically tunable all-dielectric optical metasurfaces based on liquid crystals", Applied Physics Letters, 2017, vol. 110, No. 7: 071109, pp. 1-4.

Lavrentovich et al., "Nonlinear electrophoresis of dielectric and metal spheres in a nematic liquid crystal", Nature, 2010, vol. 467, No. 7318, pp. 947-950.

Lavrentovich, "Transport of particles in liquid crystals", Soft Matter, 2014, vol. 10, No. 9, pp. 1264-1283.

Lee et al., "Thermal actuated solid tunable lens", IEEE Photonics Technology Letters, 2006, vol. 18, No. 21, pp. 2191-2193.

Li et al., "Infrared refractive indices of liquid crystals", Journal of Applied Physics 2005, vol. 97, No. 7: 073501, pp. 1-6.

Li et al., "Nonlinear photonic metasurfaces", Nature Reviews Materials, 2017, vol. 2, No. 5, pp. 1-14.

Liu et al., "Infrared perfect absorber and its application as plasmonic sensor", Nano letters, 2010, vol. 10, No. 7, pp. 2342-2348.

Liu et al., "Multispectral spatial and frequency selective sensing with ultra-compact cross-shaped antenna plasmonic crystals", Sensors and Actuators B: Chemical, 2015, vol. 215, pp. 480-488.

Liu et al., "Polarization-Induced Tunability of Plasmonic Light Absorption in Arrays of Sub-Wavelength Elliptical Disks", Plasmonics, 2016, vol. 11, No. 1, pp. 79-86.

(56)        References Cited

OTHER PUBLICATIONS

Lohr et al., "Elasticity-dependent selfassembly of micro-templated chromonic liquid crystal films", Soft Matter, 2014, vol. 10, No. 19, pp. 3477-3484.

Luo et al., "Deck the walls with anisotropic colloids in nematic liquid crystals", Langmuir, 2019, vol. 35, No. 28, pp. 9274-9285.

Luo et al., "Experimental realization of the "lock-and-key" mechanism in liquid crystals", Soft Matter, 2016, vol. 12, pp. 6027-6032.

Luo et al., "Tunable colloid trajectories in nematic liquid crystals near wavy walls", Nature communications, 2018, vol. 9, No. 1, pp. 1-11.

Makarov et al., "Light-Induced Tuning and Reconfiguration of Nanophotonic Structures", Laser & Photonics Reviews, 2017, vol. 11, No. 5: 1700108, pp. 1-25.

Moitra et al. "Large-scale all-dielectric metamaterial perfect reflectors" ACS Photonics, 2015, vol. 2, No. 6, pp. 692-698.

Molesky et al., "Inverse design in nanophotonics", Nature Photonics, 2018, vol. 12, No. 11, pp. 659-670.

Najiminaini et al., "Bolus tracking with nanofilter-based multispectral videography for capturing microvasculature hemodynamics", Scientific reports, 2014, vol. 4, pp. 1-9.

Ni et al., "Metasurface holograms for visible light", Nature communications, 2013, vol. 4, No. 1, pp. 1-6.

Ni et al., "Programmable colloidal molecules from sequential capillarity-assisted particle assembly", Science advances, 2016, vol. 2, No. 4: el501779, pp. 1-7.

Ou et al., "An electromechanically reconfigurable plasmonic metamaterial operating in the nearinfrared", Nature nanotechnology, 2013, vol. 8, No. 4, pp. 252-255.

Papaioannou et al., "Two-dimensional control of light with light on metasurfaces", Light: Science & Applications, 2016, vol. 5, No. 4, e16070, pp. 1-5.

Parry et al., "Active tuning of high-Q dielectric metasurfaces", Applied Physics Letters, 2017, vol. 111: 053102, pp. 1-4.

Pratibha et al., "Tunable optical metamaterial based on liquid crystal-gold nanosphere composite", Optics express, 2009, vol. 17, No. 22, pp. 19459-19469.

Raman et al., "Passive radiative cooling below ambient air temperature under direct sunlight", Nature, 2014, vol. 515, pp. 540-544.

Ravnik et al., "Landau-de Gennes modelling of nematic liquid crystal colloids", Liquid. Crystals, 2009, vol. 36, No. 10-11, pp. 1201-1214.

Ren et al., "Nanostructured plasmonic medium for terahertz bandwidth all-optical switching", Advanced Materials, 2011, vol. 23, No. 46, pp. 5540-5544.

* cited by examiner

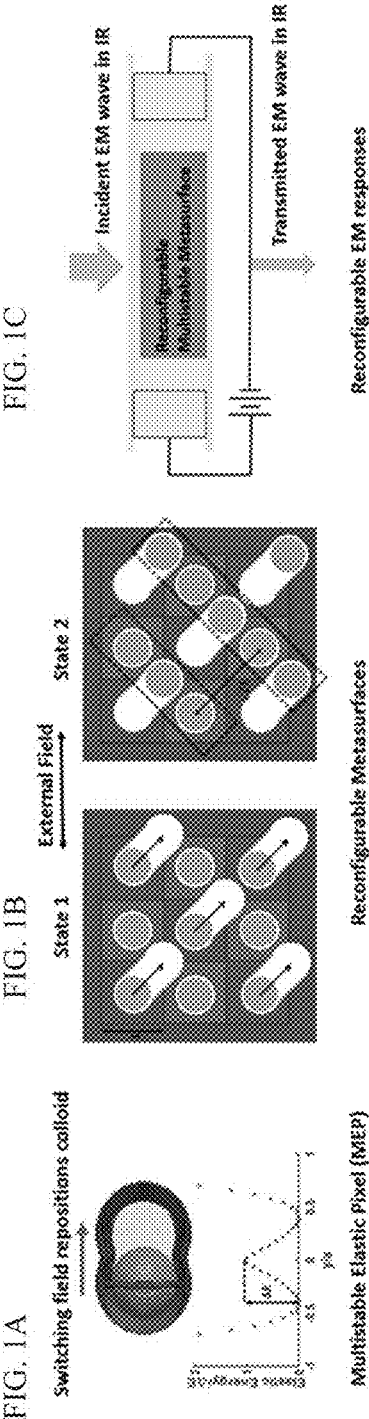

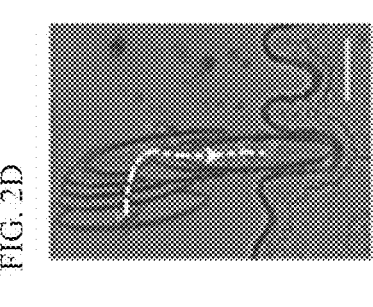
FIG. 2D
FIG. 2C
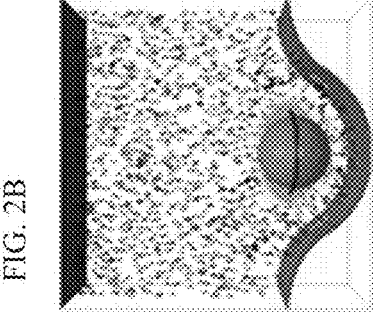
FIG. 2B
FIG. 2A
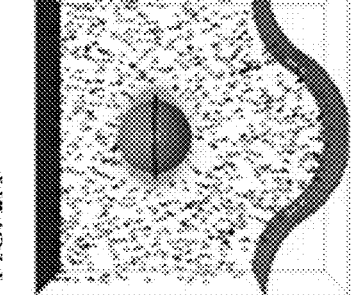

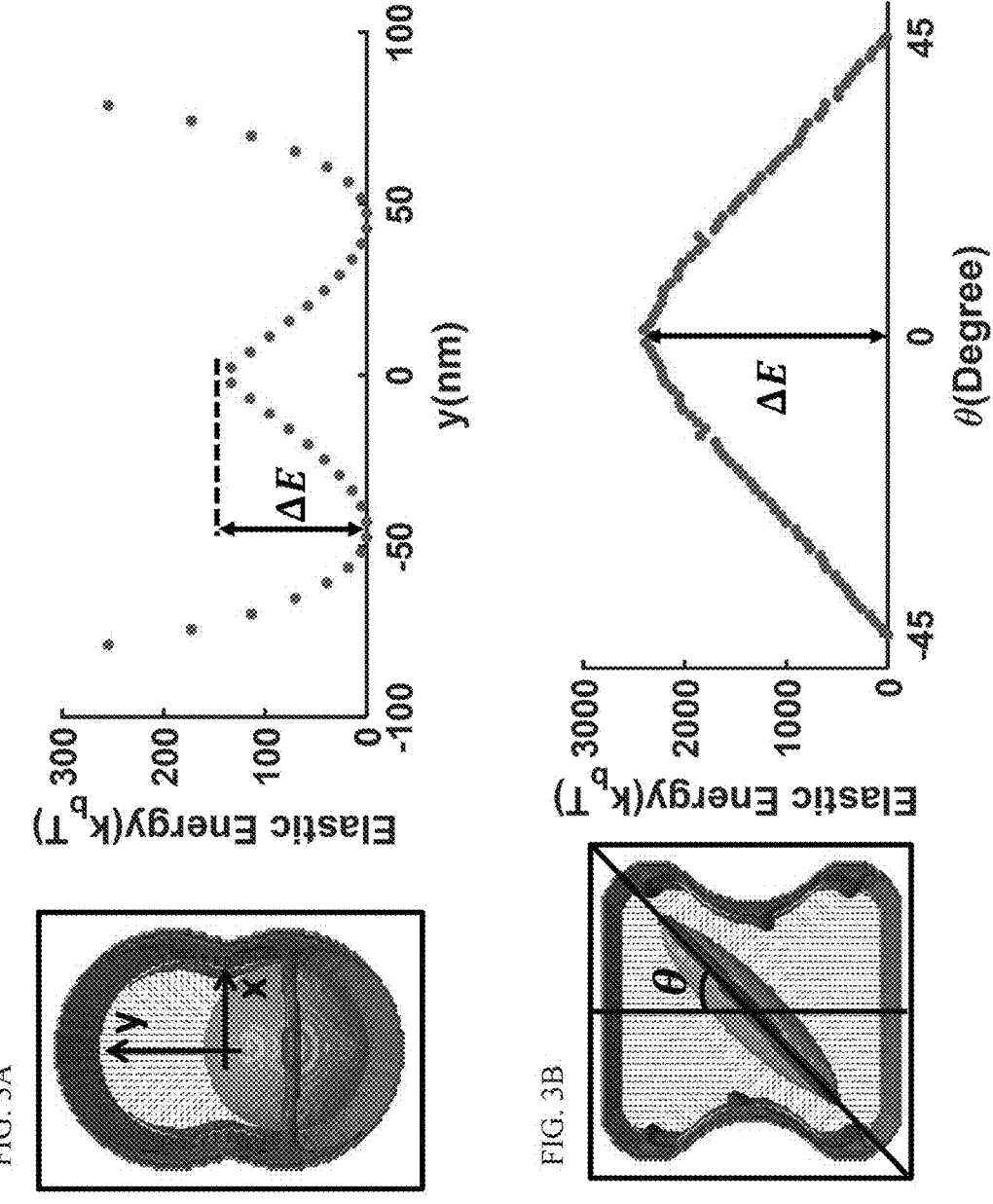

Side View

Top View

State 1

State 2

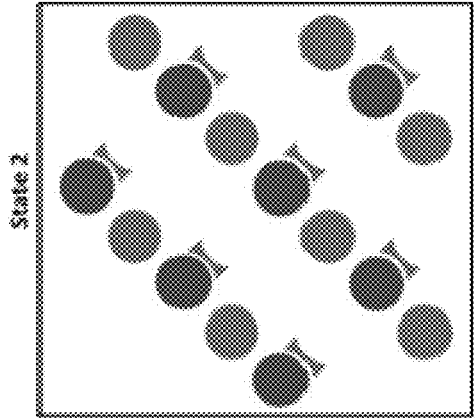
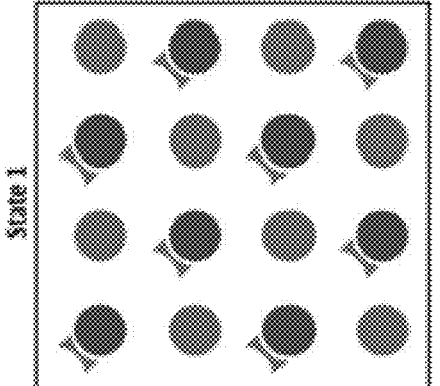
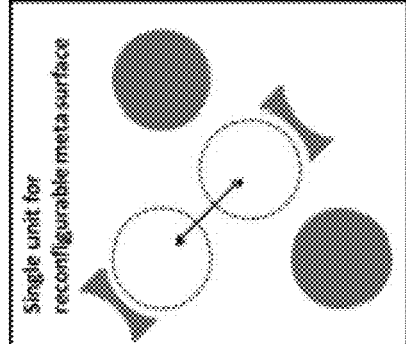
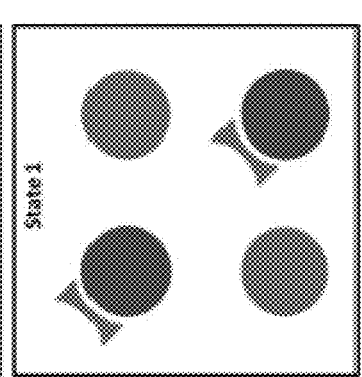
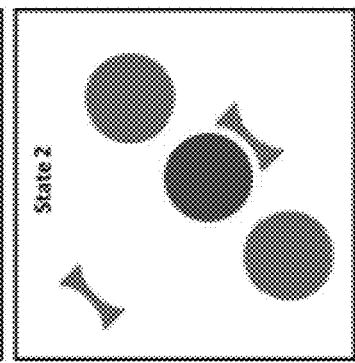
FIG. 11

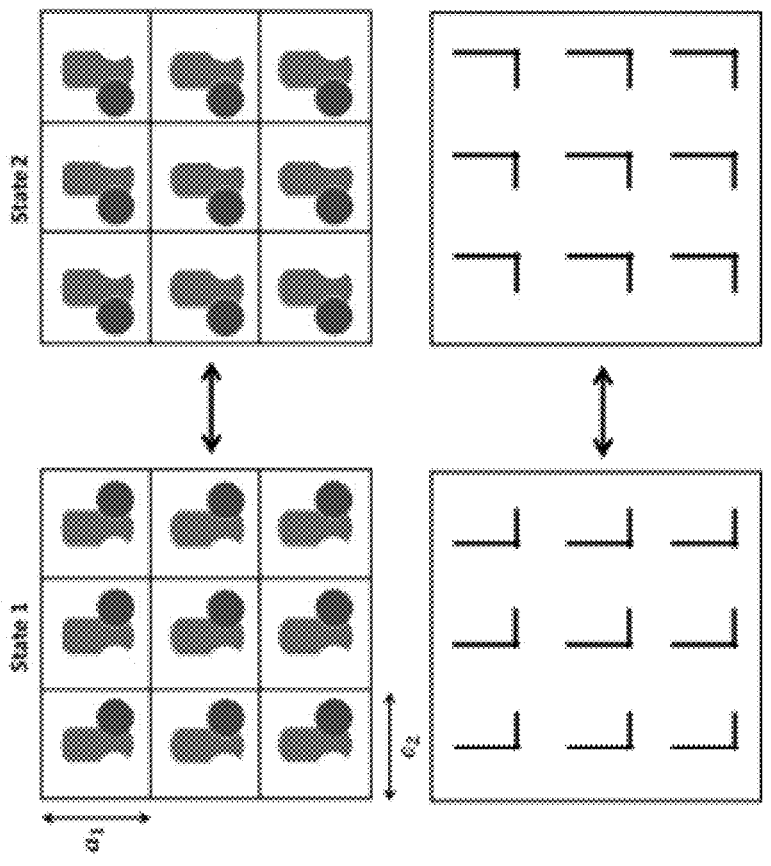
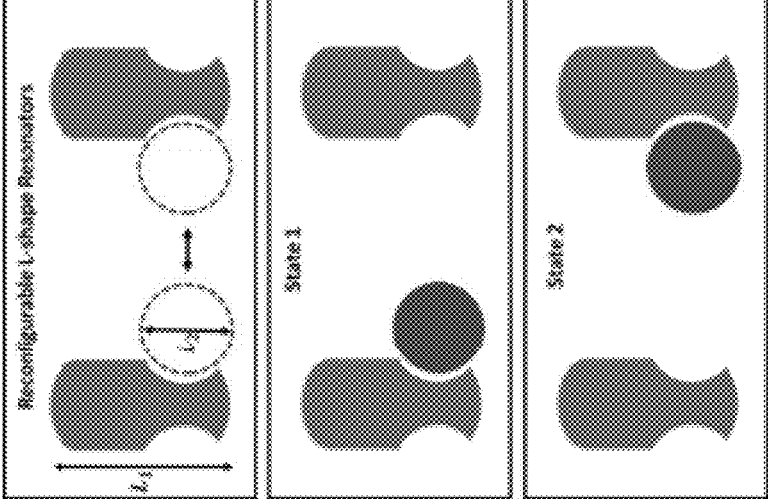
FIG. 13

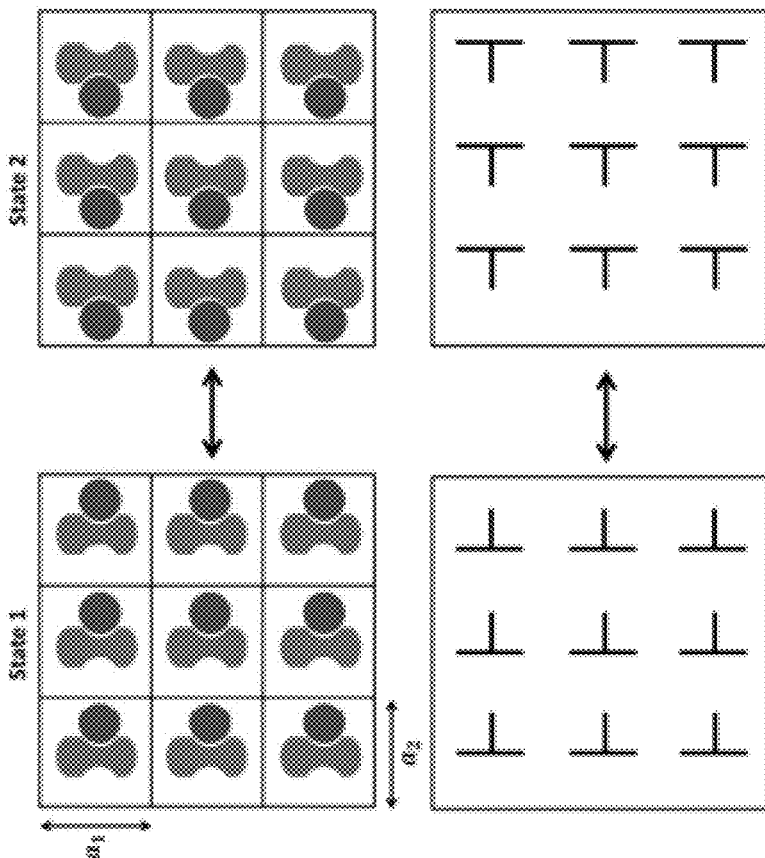
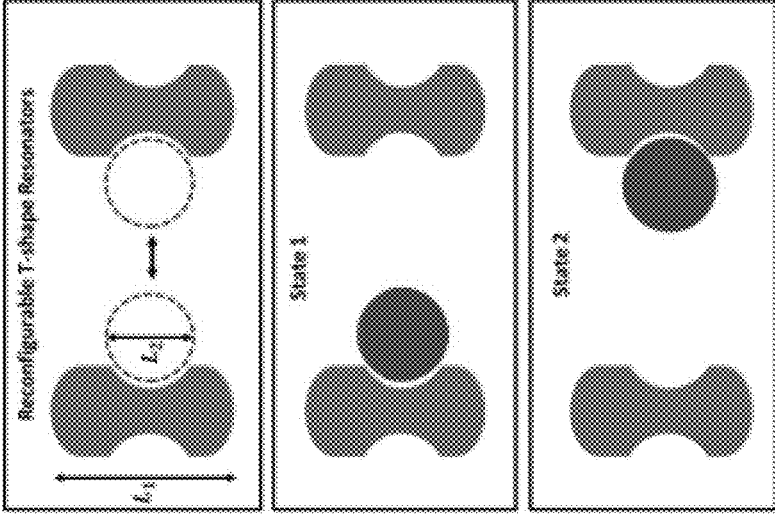
FIG. 14

Circular

Pillbox

Peanut

Peanut with connector section
connecting lobes

1

MULTISTABLE ELASTIC PIXEL (MEP)-BASED REVERSIBLY RECONFIGURABLE METASURFACES

RELATED APPLICATIONS

The present application claims priority to and the benefit of U.S. patent application No. 63/374,723 (filed Sep. 6, 2022) and U.S. patent application No. 63/380,622 (filed Oct. 24, 2022). All foregoing applications are incorporated herein by reference in their entireties for any and all purposes.

GOVERNMENT RIGHTS

This invention was made with government support under W911NF1610288 awarded by ARO (Army Research Office). The government has certain rights in the invention.

TECHNICAL FIELD

The present disclosure relates to the field of multistable metasurfaces.

BACKGROUND

Metamaterials are engineered materials with periodic or non-periodic subwavelength (e.g., micro/nano) building blocks with distinct responses to electromagnetic waves that cannot be readily achieved in nature. One of the main research directions in this field is to develop reconfigurable metamaterials whose functionality can be tuned after fabrication with full reversibility and with little energy to maintain it at a given state. Existing reconfigurable metamaterials (e.g., metasurfaces that manipulate the transmission of electromagnetic waves) suffer from several drawbacks, including limited reversibility and the need to have energy constantly applied in order for the system to maintain a given state.

Accordingly, there is a crucial need in the field for reconfigurable metamaterials that are fully reversible and do not necessarily require energy input in order to maintain a particular state.

SUMMARY

In meeting the described challenges, the present disclosure first provides reconfigurable multistable metasurface components, comprising: a substrate, the substrate defining a first confinement volume; a first element disposed within the first confinement volume; and the first confinement volume and the first element are configured such that: (a) in the absence of applied energy to the first element, the first element maintains a first mechanically stable state within the first confinement volume or maintains a second mechanically stable state within the first confinement volume; and (b) application of an energy reversibly encourages the first element from one of the first mechanically stable state within the first confinement volume or the second mechanically stable state within the first confinement volume to the other mechanically stable state, wherein a state refers to at least one of a positional state and a rotational state.

Also provided are methods, comprising: applying an energy to a reconfigurable multistable metasurface component according to the present disclosure so as to reversibly encourage the first element from one of the first mechanically stable state within the first confinement volume and the second mechanically stable state within the first confinement volume to the other mechanically stable state.

Further provided are reconfigurable multistable metasurface components, comprising: (a) a set of first confinement volumes and a set of first elements disposed within the set of first confinement volumes, the set of first confinement volumes and the set of first elements being configured such that: (1) in the absence of applied energy to the set of first elements, the first elements maintain first mechanically stable states within their respective first confinement volumes or maintain second mechanically stable states within their respective first confinement volumes; and (2) application of an energy reversibly encourages the set of first elements from their first mechanically stable states or their second mechanically stable states to the other mechanically stable state; and (b) a plurality of fixed elements; (c) a set of second confinement volumes and a set of second elements disposed within the set of second confinement volumes, the set of second confinement volumes and the set of second elements being configured such that (1) in the absence of applied energy to the set of second elements, the second elements maintain first mechanically stable states within their respective second confinement volumes or maintain second mechanically stable states within their respective second confinement volumes; and (2) application of an energy reversibly encourages the set of second elements from the second mechanically stable states or the second mechanically stable states to the other mechanically stable state; or (d) both (b) and (c).

Additionally provided are methods, comprising: applying an energy to a reconfigurable multistable metasurface component according to the present disclosure so as to reversibly encourage the first element from one of the first mechanically stable state within the first confinement volume and the second mechanically stable state within the first confinement volume to the other mechanically stable state.

Further disclosed are reconfigurable multistable metasurface components, comprising: a substrate, the substrate defining a first confinement volume; a first element disposed within the first confinement volume; and the first confinement volume and the first element being configured such that (a) an applied energy to the first element reversibly encourages the first element from one of a plurality of mechanically stable states within the first confinement volume to another of the plurality of mechanically stable states within the first element, and (b) the first element maintains any of the plurality of mechanically stable states in the absence of applied energy.

Also provided are reconfigurable multistable metasurface components, comprising: a first plurality of elements disposed within a first confinement volume so as to form a first multimer that comprises the plurality of elements in register with one another; a second plurality of elements disposed within a second confinement volume so as to form a second multimer that comprises the second plurality of elements in register with one another; and the first confinement volume and the first element are configured such that: (a) in the absence of applied energy to the first plurality of elements, the first plurality of elements maintains the first multimer in a first mechanically stable state within the first confinement volume; and (b) application of an energy reversibly encourages at least one of the first plurality of elements within the first confinement volume so as to remove that at least one element from the first multimer, wherein a state refers to at least one of a positional state and a rotational state.

Further provided are reconfigurable multistable metasurface components, comprising: a plurality of protrusions extending from a surface, each protrusion having a first concavity facing a first direction and having a second concavity facing a second direction, and the plurality of protrusions optionally being periodically arranged; a plurality of fixed pillar resonators extending from the surface, the plurality of fixed pillar resonators optionally being periodically arranged; and a plurality of moveable elements, the plurality of moveable elements configured such that the application of an external field reversibly converts the component from one of a first mechanically stable state and a second mechanically stable state to the other of the first mechanically stable state and the second mechanically stable state, wherein (a) in the first mechanically stable state, each of the plurality of moveable elements associates with the first concavity of a first protrusion such that a periodic lattice is defined by the resonators and the moveable elements; and (b) in the second mechanically stable state, each of the plurality of moveable elements associates with the second concavity of a second protrusion so as to define a chain (which can also be referred to as a multimer) comprising protrusions and moveable elements in register with one another, wherein a state refers to at least one of a positional state and a rotational state.

Also provided are methods, comprising applying an external field to a component according to the present disclosure (e.g., any one of Aspects 32-40) so as to convert the component from one of the first mechanically stable state and the second mechanically stable state to the other of the first mechanically stable state and the second mechanically stable state.

Also provided are reconfigurable multistable metasurface components, comprising: a plurality of protrusions extending from a surface, each protrusion comprising a first concavity along a first direction, a second concavity opening along a second direction that is perpendicular to the first direction, a third concavity opposite the first concavity and opening along the first direction, and a fourth concavity opposite the second concavity and opening along the second direction, and the plurality of protrusions being periodically arranged; and at least one moveable resonator, the at least one moveable resonator defining a major axis and a first end and a second end lying along the major axis, the at least one moveable resonator being positioned such that the application of an external field reversibly converts the component from one of a first mechanically stable state and a second mechanically stable state to the other of the first mechanically stable state and the second mechanically stable state, wherein (a) in the first mechanically stable state, the major axis of the moveable resonator lies along the first direction and the first end of the moveable resonator is associated with the third concavity of a first protrusion and the second end of the moveable resonator is associated with the first concavity of a third protrusion, and (b) in the second mechanically stable state, the major axis of the moveable resonator lies along the second direction and the first end of the moveable resonator is associated with the fourth concavity of a second protrusion and the second end of the moveable resonator is associated with the second concavity of a fourth protrusion, wherein a state refers to at least one of a positional state and a rotational state.

Also provided are methods, comprising applying an external field to a component according to the present disclosure (e.g., any one of Aspects 41-44) so as to convert the component from one of the first mechanically stable state and the second mechanically stable state to the other of the first mechanically stable state and the second mechanically stable state.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings:

The patent or application file contains at least one drawing executed in color. Copies of this patent or patent application publication with color drawing(s) will be provided by the Office upon request and payment of the necessary fee.

FIGS. 1A-1C—Pixelated, reversible, reconfigurable metasurfaces in the IR range: (FIG. 1A) Provided are introduce reconfigurable elements, multistable elastic pixels (MEPs). Within MEPs, stable colloid locations are separated by significant energy barriers $\Delta E \sim 500\text{-}10^3$ $k_B T$ for microscale colloids, defined using the physics of colloids in confining volumes filled with nematic liquid crystals (NLCs). Colloids move from one stable location to another under an external switching field. (FIG. 1B) Provided are designs for pixelated, reversible, reconfigurable metasurfaces with fixed scatterers and strategically placed MEPs. Within MEPs, colloids are in initial positions poised close to resonance; (FIG. 1C) The metasurfaces change their electromagnetic (EM) properties dramatically upon re-positioning of the colloids. One can use microscale colloids to make a range of metasurfaces to manipulate EM response in the IR.

FIGS. 2A-2D—NLC Elastic interactions guide colloid to stable states near curved walls. FIG. 2A. Simulation of NLC director field for colloid with homeotropic anchoring adjacent to wavy wall. The bend and splay distortions in the director field adjacent to colloid and wavy wall are matched or compatible. FIG. 2B. Colloid assumes stable state adjacent to wall to minimize distortion of director field. FIG. 2C. Experiment: trajectory (yellow) of spherical colloid interacting with wall guided solely by NLC elastic energy. FIG. 2D. Ellipsoidal microparticle trajectory (white) driven solely by NLC elastic energy near wall. Scale bars are 10 (sphere) and 25 (ellipsoid) microns respectively.

FIGS. 3A-3B—Multistable Elastic Pixel (MEP) design FIG. 3A. Simulated NLC director field around a spherical colloid in a peanut shaped MEP. The NLC elastic energy minima define stable positions; the energy barrier between them is significant, requiring an external switching field to move from one to the other. For the particle of diameter 2a=225 nm used in the simulation, two stable states (one on top and the other at the bottom) are recognized with an energy barrier $\Delta E \sim 150$ $k_B T$ for switching. FIG. 3B. Simulated NLC director field in an hour-glass shaped MEP to control ellipsoid orientation. The NLC elastic energy defines stable orientations at 45° and −45° with energy barrier $\Delta E \sim 2400$ $k_B T$ for an ellipsoid of major and minor axes 2a=360 nm and 2b=90 nm, respectively.

FIG. 5B. Transmission in State 1, (black line; lattice constant L/2a=1.787) and State 2 (red line; lattice constant L/2a=2.5) for incident wave polarized along the major axis of the dimers. Inset: Electric field distributions around resonators in a unit cell for a single silver disk and for silver dimers. At $\lambda=3.476$ μm; the differences in transmission, $\Delta T=83\%$ (vertical blue dashed line).

FIG. 6B. Transmission for State 1, L/2a=1.556 (black line) and State 2, for particle chain spacing S/2a=2.2 and interparticle distance d/2a=0.1 for electric field parallel to the chain (red curve) for silver disks of diameter 2a=1 μm. Inset: electric field distribution in one unit cell: State 1 (black dash outlined) and State 2 (red dash outlined) at $\lambda=3.626$ μm as indicated by the blue dash line. FIG. 6C. Polarization-dependent response of the surface in State 2: an unpolarized incident wave is polarized in State 2. Transmission for electric field is parallel to the chain (red line) and perpendicular to the chain (blue line). Inset: electric field distribution in one simulation cell for chain of particles when the electric field is parallel to the chain (red dash outlined) and perpendicular to the chain (blue dash outlined) at $\lambda=3.626$ μm (black dash line).

FIG. 7B. Transmission of the surface in State 1 (red curve) and State 2 (blue curve) for incident electric field parallel to the major axis of ellipse in State 1 and perpendicular to it in State 2. Insets: Electric field distribution in one lattice for State 1 (right, E-field parallel to the ellipse major axis) and State 2 (left, E-field perpendicular to the ellipse major axis, plotted at $\lambda=3.313$ μm. The ellipse-shaped silver disks have major and minor axes of length 2a=1.8 μm, 2b=0.45 μm, lattice constant L=2 μm.

(FIG. 8A) Side view schematic. The front particle (particle 1) experiences a downward capillary force $F_C$ perpendicular to the meniscus. The arrow indicates the direction of the flow. (FIG. 8B) Top view schematic. The blue dashed line indicates the position of the meniscus and the black dashed line indicates the plane of view in (FIG. 8A). As shown (and without being bound to any particular theory or embodiment), one can contact a particle suspension to a patterned surface such that particles from the suspension are deposited in the spaces between the features of the patterned surface. Without being bound to any particular theory, one can tune the evaporation rate of the solvent of the particle suspension as desired. It should be understood, however, that capillary-assisted particle assembly is not the only way to fabricate the disclosed structures, as one can fabricate the disclosed structures in other ways, for example, using magnetic microrobots, fabricating colloids directly in the pores of the patterned surfaces, printing pore walls around the colloids, and others.

FIG. 11 provides an example metasurface designed with three elements, (1) metal coated circular microposts that act as fixed resonators in the structure, (2) sickle shaped fixed microparticles that define bistable states for a colloid; and (3) a colloidal particle whose position can be moved by an external field. The design recapitulates the functions of one example metasurface we developed earlier based on the peanut shaped pores.

As shown, the design features an array of posts (in grey) with circular and sickle-shaped cross-sections that define the metasurface domain. Particle resonators (in red) can be repositioned by an external field between state 1 and 2. State 1 features a square lattice arrangement of resonators while state 2 features a chains configuration. In a case where the material of the posts interacts with EM radiation, the surface features both particle-particle and particle-post interactions. The lattice constant, dimensions of posts, and dimensions of particles can be tuned based on the wavelength of the incident wave.

Figure 12:
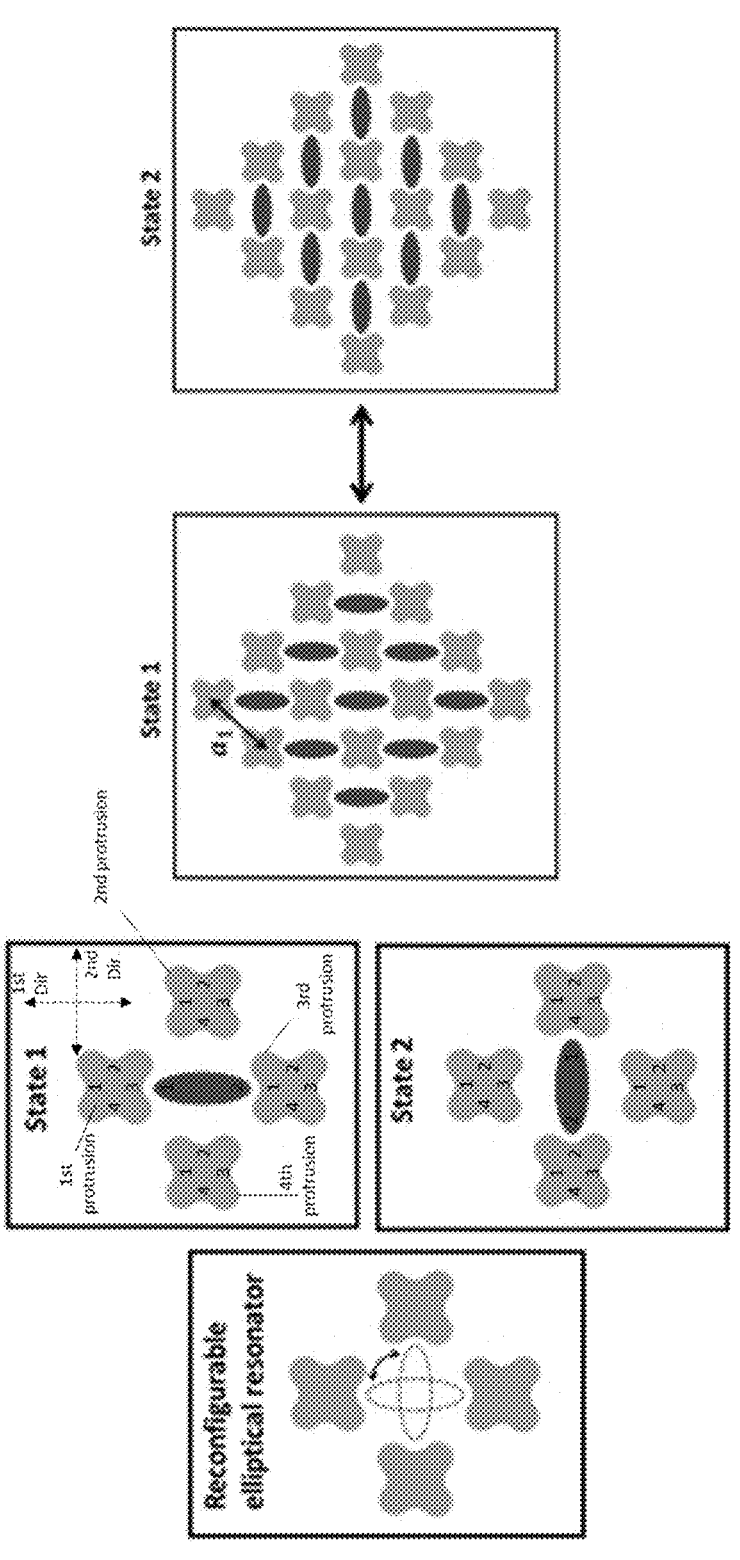

FIG. 12 provides an alternative design that exploits two elements (1) a fixed star shaped micropost to control orientation of an elongated colloidal particle and (2) A reconfigurable elliptical resonator whose orientation can be switched between two stable states (as indicated by the red and blue dashed ellipses) between fixed star-shaped microposts.

The orientation of the elliptical particles can be aligned under an external magnetic field. In state 1, all elliptical particles are aligned along the vertical direction while in state 2, they are aligned along the horizontal direction. This change in resonator orientation leads to distinct EM responses upon interaction with linearly polarized incident waves.

FIGS. 13 and 14 provide anisotropic geometries of resonators. For example, fixed anisotropic pillars, when coupled with movable particle resonators, can impart reconfigurability to classic L & T-style resonator, changing the handedness of these chiral elements. The figure below depicts how a movable resonator (shown by red dashed lines) can be reconfigured between adjacent fixed pillar resonators (in grey) to form right-handed (state 1) or left-handed (state 2) L-style arrangements. As state 1 and state 2 are mirror-symmetric, such switching will result in different EM responses when interacting with circularly polarized electromagnetic waves of opposite handedness. Similarly, T-style configurations can be designed as shown below.

Figure 15:
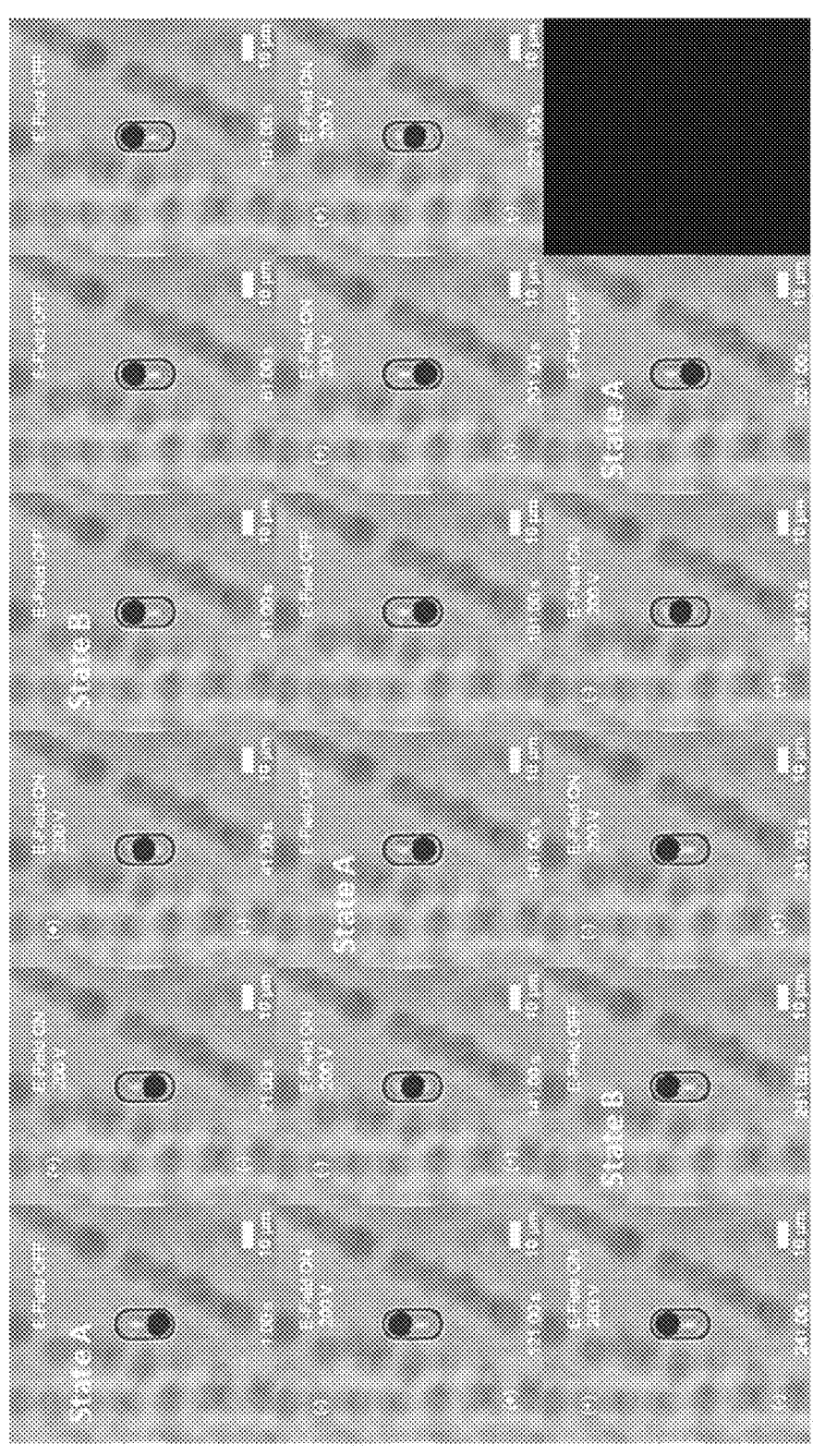

FIG. 15 provides an example time series of Electric Field-Driven Repositioning of Ag-Silica Colloids in Pillbox Pores. The location of the (+) and (–) electrode in the plane of the image, is denoted by the (+) and (–) symbols. Colloids translate towards (+) electrode. NLC cells have thickness ~25-30 μm.

Figure 16:
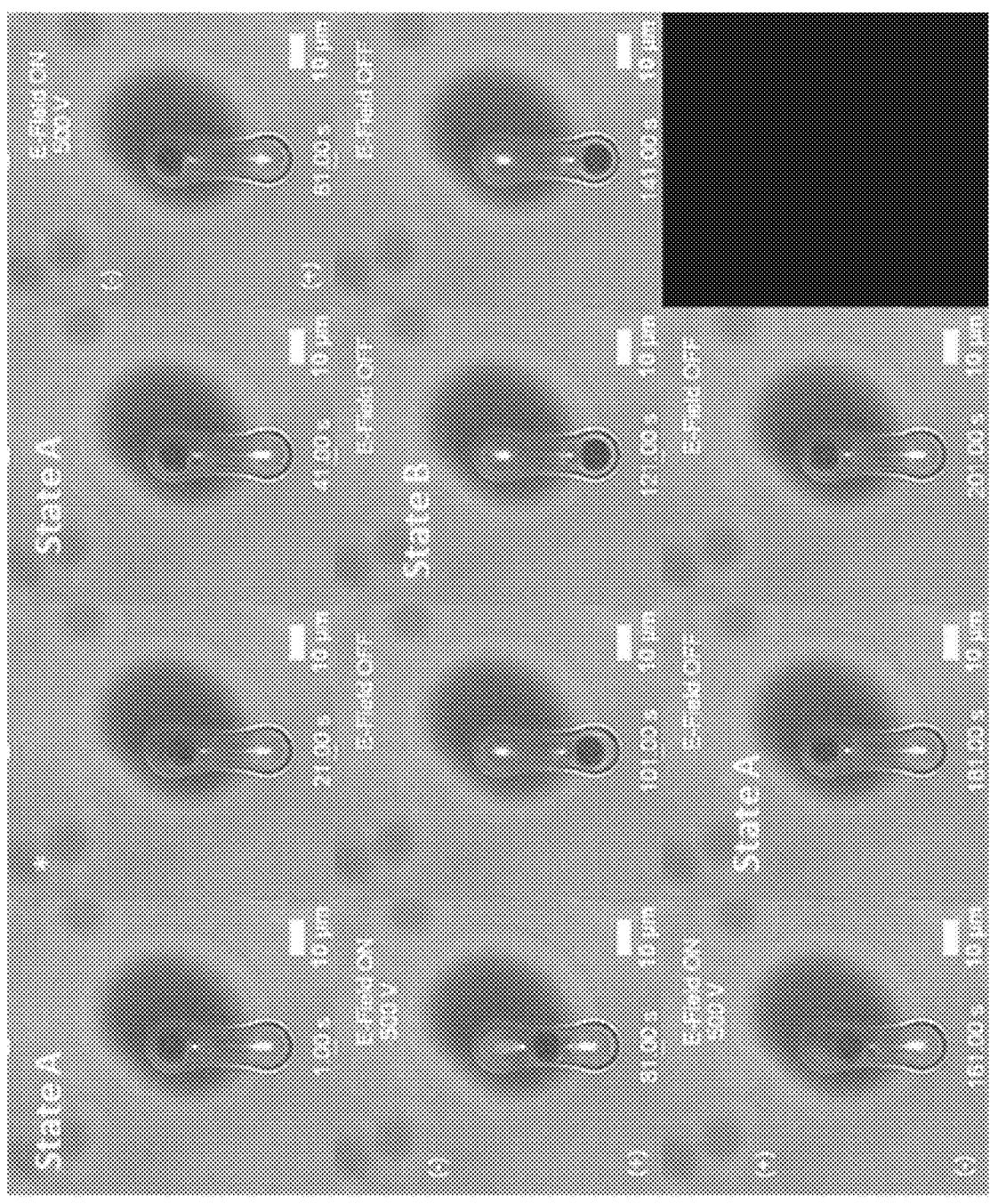

FIG. 16 provides an example time series of Electric Field-Driven Repositioning of Ag-Silica Colloids in Peanut Pores. The location of the (+) and (–) electrode in the plane of the image, is denoted by the (+) and (–) symbols. Colloids translate towards (+) electrode. NLC cells have thickness ~25-30 μm.

Figure 17:
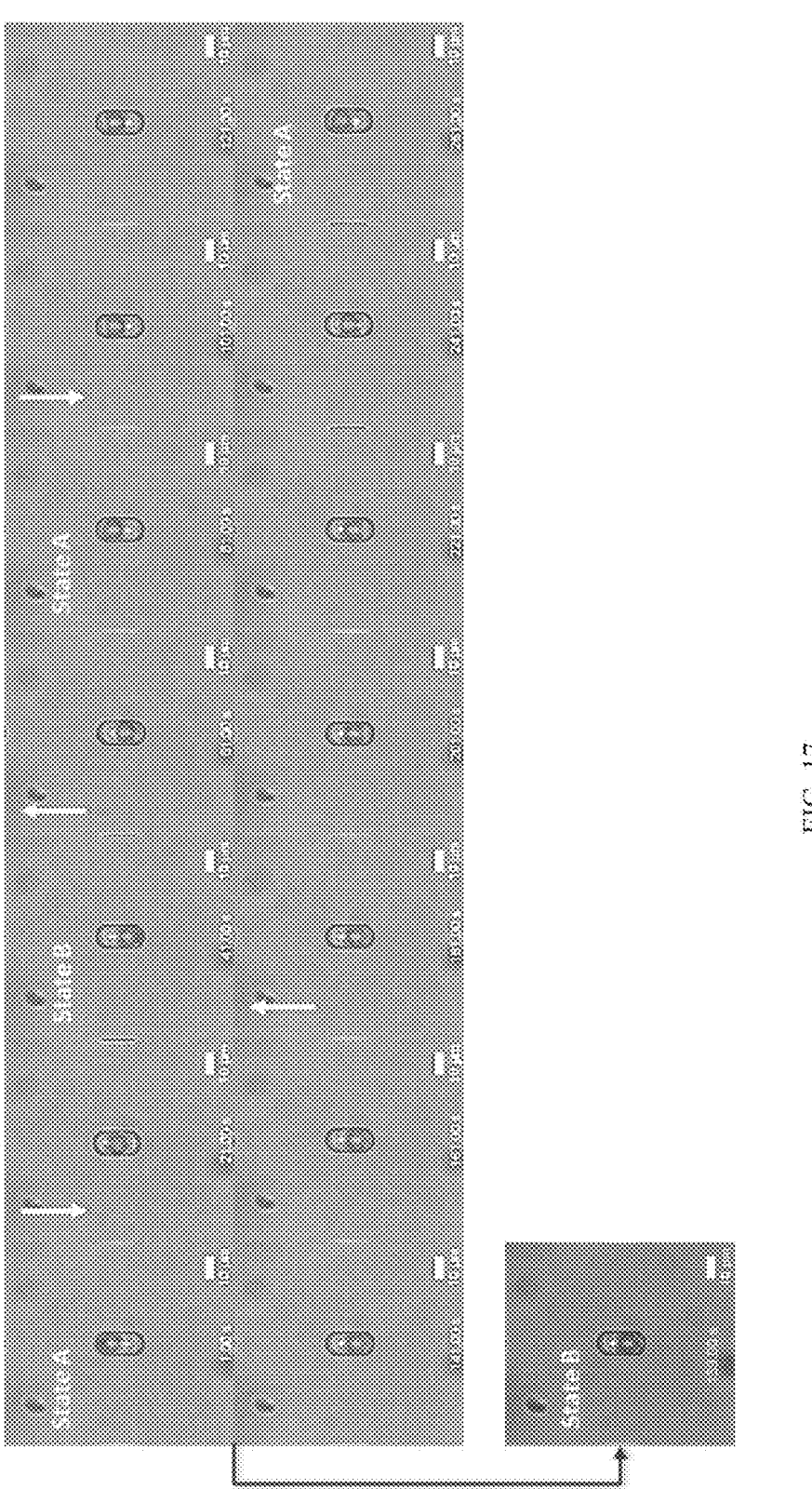

FIG. 17 provides an exemplary time series of Magnetic Field-Driven Repositioning of $CrO_2$-PS Colloids in Pillbox Pores. Arrows are a visual aid to illustrate translation direction which is determined by the position of the permanent magnet. Inset (139.00 s) illustrates that colloid reaches state B before it is repositioned to state A. NLC cells have thickness ~25-30 μm.

Figure 18:
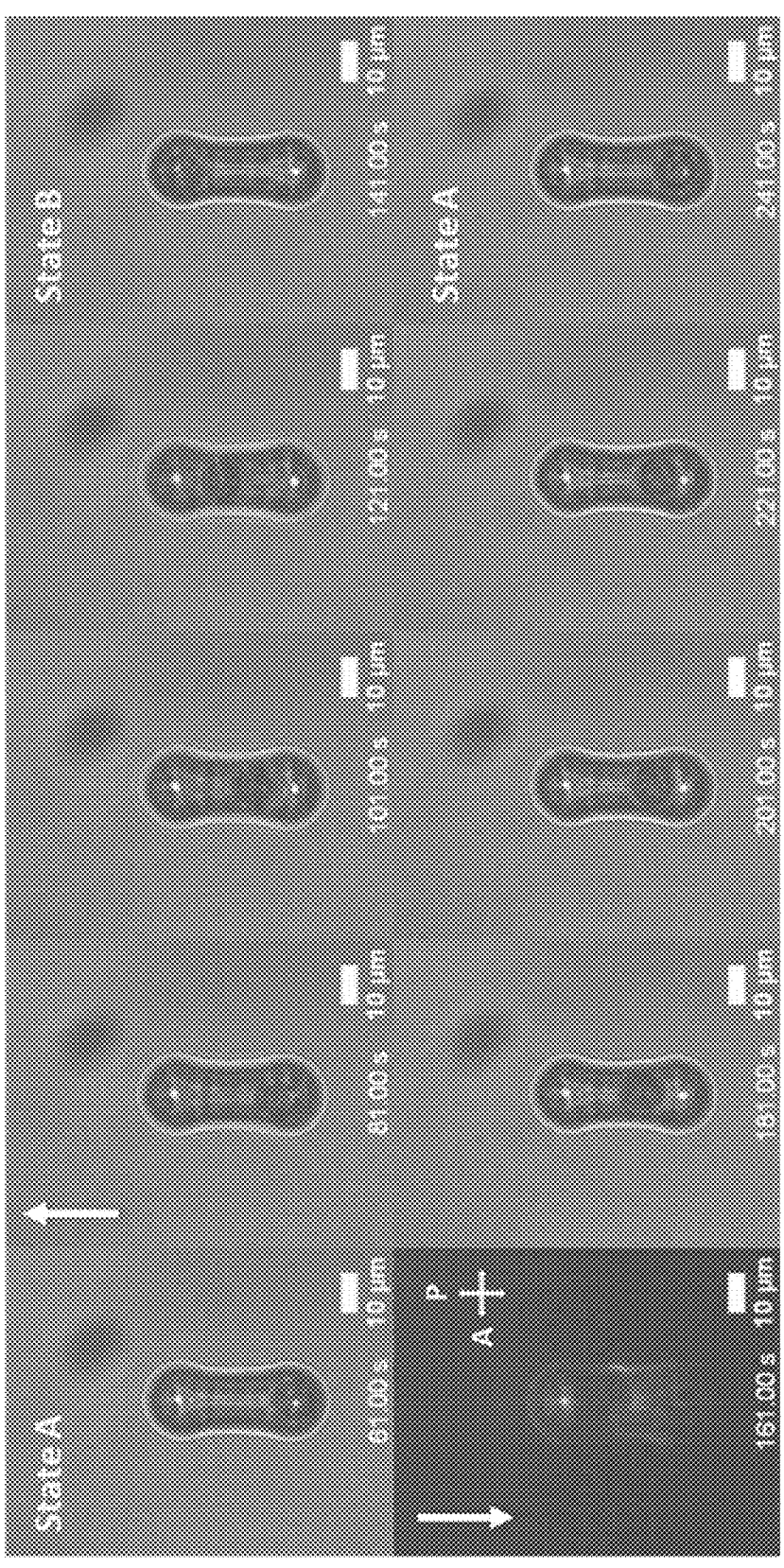

FIG. 18 provides an exemplary time series of Magnetic Field-Driven Repositioning of $CrO_2$-PS Colloids in Peanut Pores. Arrows are a visual aid to illustrate translation direction which is determined by the position of the permanent magnet. NLC cells have thickness ~25-30 μm.

Figure 19:
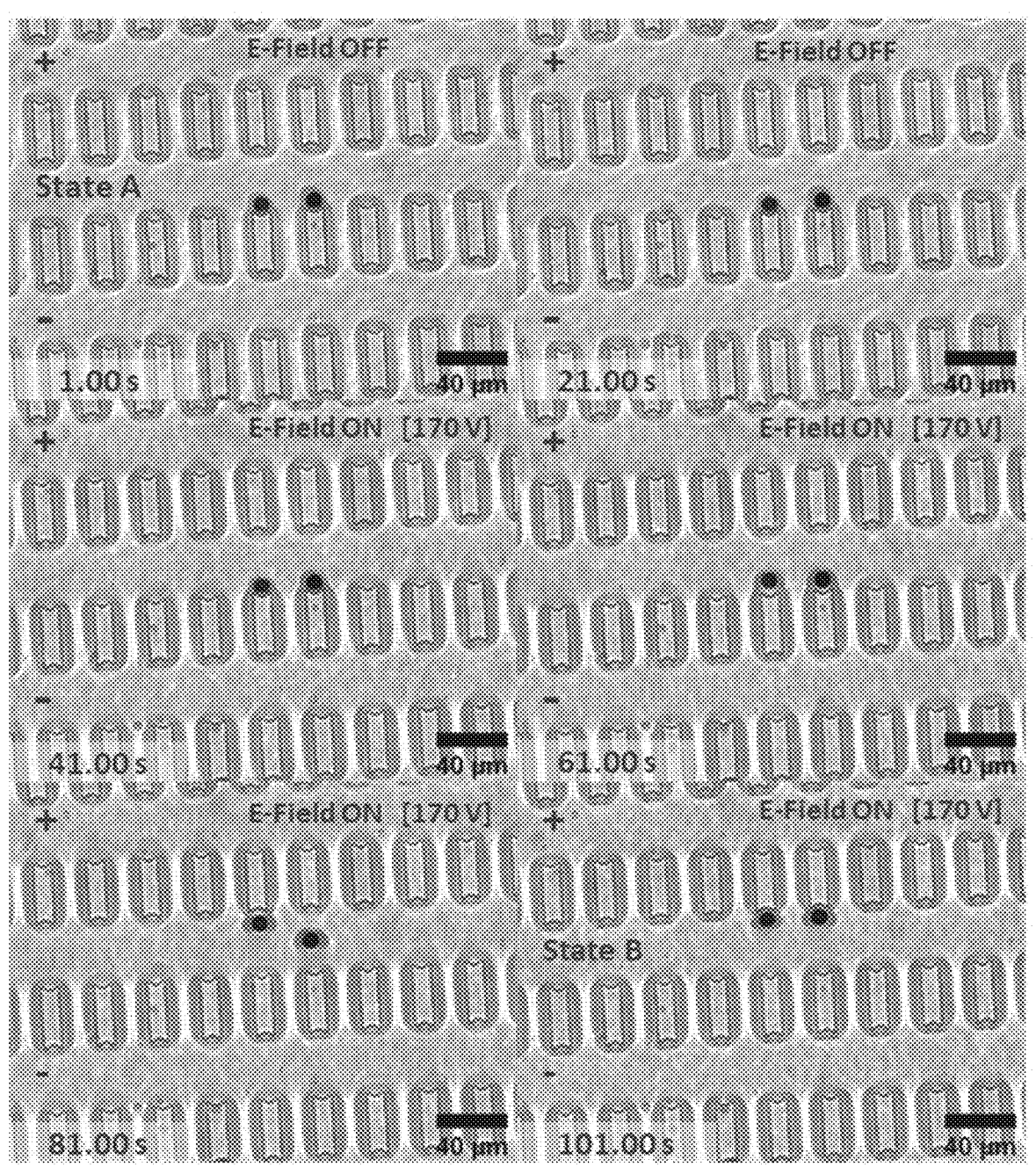

FIG. 19 provides an exemplary time series of Electric Field-Driven Repositioning of Ag-Silica Colloids on Sickle Posts. Colloids translate towards (+) electrode. Post heights=10 μm and NLC cells have thickness ~50-100 μm. Scale bar is 40 μm.

Figures 20A, 20B:
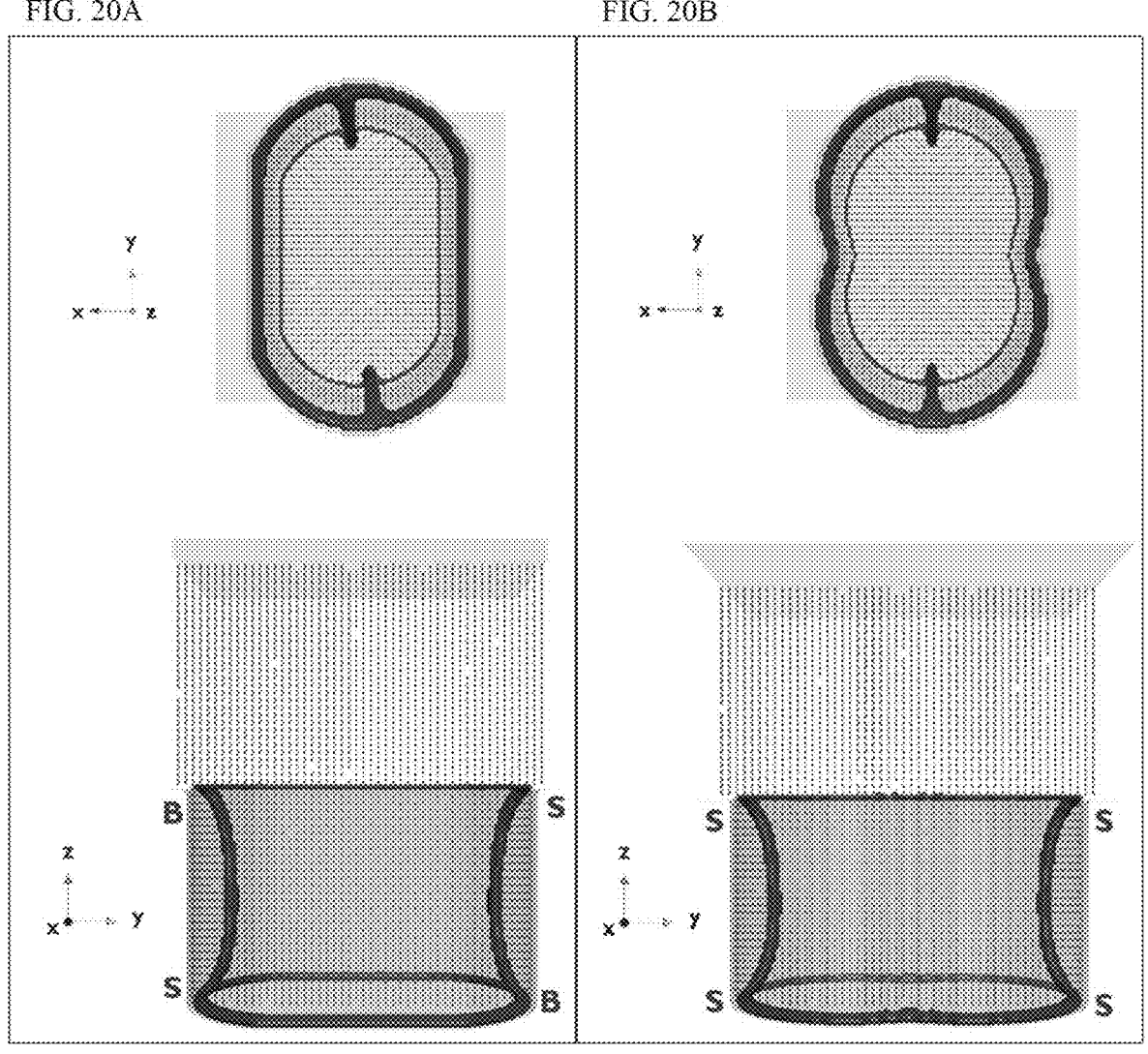

FIGS. 20A-20B provide LdG Simulations of Pores with Curved Cross-sections Filled with NLC. Pores have (FIG. 20A) circular pillbox and (FIG. 20B) peanut cross-sections in the x-y plane. Pores have analogous dimensions: simulation boxes are 450 nm by 450 nm in x-y plane and 540 nm along z. Pore heights are 270 nm, LC gaps are 270 nm, and radii of curvature are 135 nm. Director fields are shown for planes corresponding to z=135 nm and x=225 nm. Topological charges are assigned such that 'S' indicates $-\frac{1}{4}$ and 'B' indicates $+\frac{1}{4}$. Simulations are performed with 1-constant approximation.

FIGS. 21A-21F provide an illustration of experimental Pillbox and Peanut Pores Filled With NLC. Pores have depths of 10 μm. NLC cells have thickness ~25-30 μm. (FIG. 21A), (FIG. 21D) Bright-field (BF) and cross-polarized (XP) images of pillbox with single point defect; (FIG. 21B), (FIG. 21E) BF and XP images of pillbox with PPLD-like defect; (FIG. 21C), (FIG. 21F) BF and XP images of peanut with PPLD-like defect. Scale bars are 10 μm.

Figure 22:
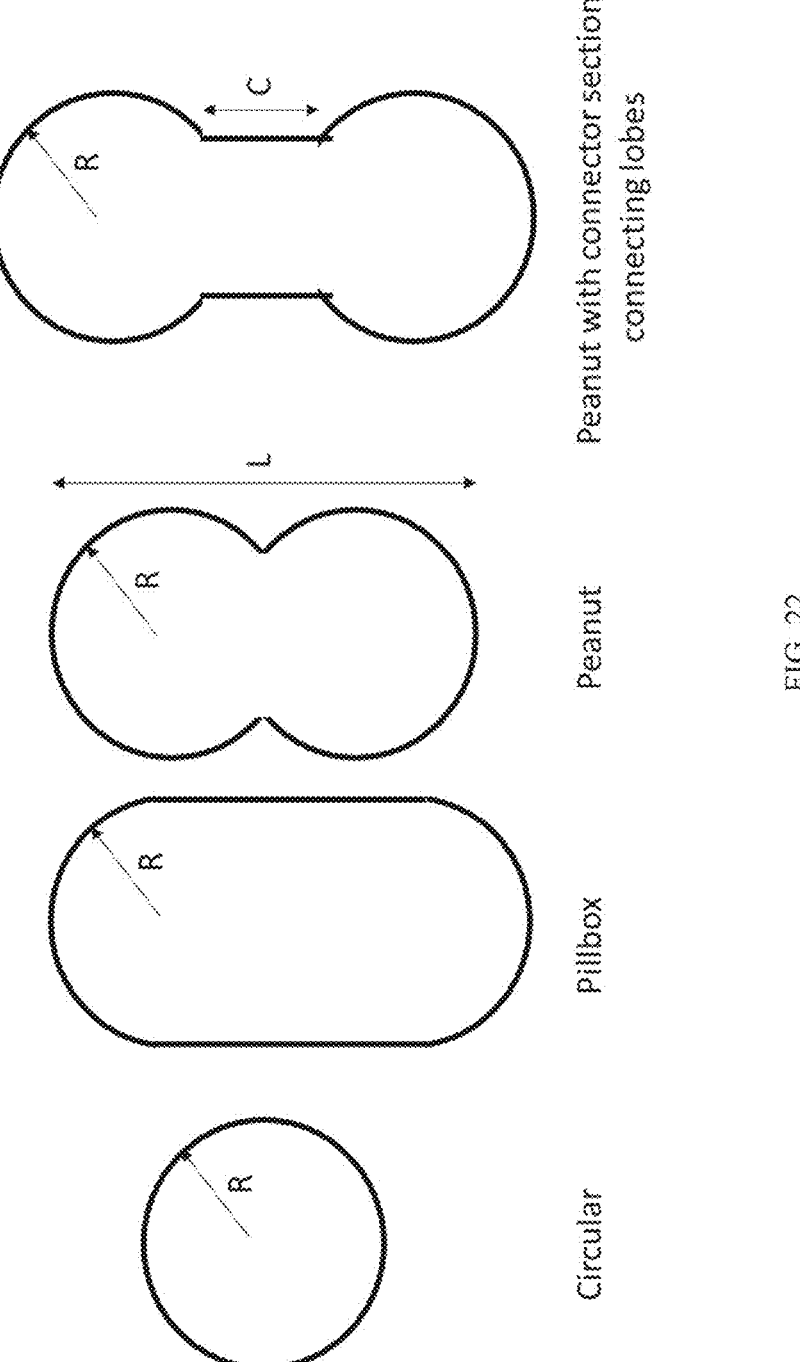

FIG. 22 provides a depiction of circular, pillbox, peanut, and peanut with connector section pores.

DETAILED DESCRIPTION OF ILLUSTRATIVE EMBODIMENTS

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of" The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4. Further, the term "comprising" should be understood as having its open-ended meaning of "including," but the term also includes the closed meaning of the term "consisting." For example, a composition that comprises components A and B may be a composition that includes A, B, and other components, but may also be a composition made of A and B only. Any documents cited herein are incorporated by reference in their entireties for any and all purposes.

Discussion

As illustrated in non-limiting FIG. 1, the present disclosure provides tunable pixelated elements we term multistable elastic pixels (MEPs) (FIG. 1A), introduced in this research. MEPs consist of a colloid confined in a NLC-filled volume with wall shape and surface chemistries which dictate an NLC elastic energy landscape that defines stable colloid positions.

These multistable elements can be designed to have two or more docking locations with well-defined elastic energy minima, separated by significant energy barriers that prevent spontaneous colloid movement. To change colloid location, a switching field is needed to overcome this barrier. Once the colloid is moved, the switching field can be removed, and the system will persist in the new state.

Without being bound to any particular theory, one can estimate that MEP switching rate will be on the order of tenths of seconds to seconds, as determined by the balance of viscous drag, NLC-elastic forces and switching forces, all typically on the order of 1-10 pN, with required field strengths of order ~1 kV/m for electrophoretic switching fields. Thus, the disclosed approach is of particular interest in systems where rapid switching is not required, but long-lived bistable configurations are desirable, e.g. reconfigurable windows to control energy flux.

The high versatility of this pixelated approach can be shown via examples of reconfigurable structures (FIG. 1B), including narrow-band filters, broad-band filters, metasurfaces with switchable polarizing responses, and other functionalities. Metasurface design exploits strategically located MEPs and fixed pixels containing colloidal scatterers. By changing colloid position within MEPs, one can realize strong change in metasurface EM response (FIG. 1C).

Responses to EM waves can be simulated using the numerical-finite-element (FEM) method and through COMSOL Multiphysics® commercial software: Frequency domain radio frequency (RF) module. Periodic structures are modeled as unit cells excited with Floquet ports. The distribution of EM fields and transmission/reflection coefficients are used to characterize the metasurfaces.

Throughout this disclosure are discussed three energy fields, specifically, the elastic free energy of the colloid and NLC within the MEPs, the EM responses of the metasurfaces, and the external switching fields used to change MEPs and metasurfaces from one state to another. One can focus on micron-scale colloids for proof of concept, as the colloid position is visible by optical microscopy, and microscale fabrication is less demanding. Thus, metasurfaces can operate in the IR range. These concepts are, however, broadly applicable to other wavelengths by changing colloid diameter; the NLC physics on which the MEPs rely persists for colloids as small as 100 nm in diameter.

Metasurfaces and Review of Reconfigurable Metasurfaces

Metamaterials, engineered materials with properties beyond those found in nature, typically consist of discrete elements of materials arranged in periodic or aperiodic patterns at scales smaller than the wavelengths of the waves they influence. In addition to the constituent material properties, shape, size, orientation and arrangement also play roles in manipulating EM waves [4,5], acoustic waves [6] and thermal waves [7] by deflecting, absorbing or enhancing those waves to achieve properties that are rarely found in conventional materials. In this disclosure, we focus on metasurfaces in the EM domain. Among metamaterials, those that alter EM responses draw the greatest interest as they are able to modulate the propagating behaviors of EM waves covering terahertz (THz), infrared (IR) and visible wavelengths [8]. Various EM metamaterials have been tailored to exhibit exotic and intriguing effects, such as negative refraction [9], perfect lensing [10], and cloaking [11]. However, the fabrication of three-dimensional (3D) large-scale metamaterials and their significant propagation loss remain a major technological challenge. Planar metamaterials, or metasurfaces, offer intriguing (but non-limiting) routes to accomplish desirable functionalities while circumventing these hurdles.

Metasurfaces have been designed to manipulate wavefronts [12], for polarization conversion [13], and for absorption/emission engineering [14]. To reduce the effect of material losses, it is desirable to minimize the wave-matter interaction volume. Thus, metasurfaces with thicknesses much smaller than the operational wavelength have been exploited in many applications such as beam reflector/deflector [15-17], sensing [18], compressive imaging [19], holograms [20,21], and thermal management [22]. The vast majority of metasurfaces that have been fabricated are passive, in that they cannot be reconfigured, and their EM properties are invariant once they are fabricated. This significantly limits their potential applications, as they can only interact with waves of certain wavelengths, and always in the same manner of response. A broad range of new applications are enabled by actively and reversibly changing the functionality of the metasurface. With such reconfigurable metasurfaces, advances including beam reflectors with adjustable angle of deflection and interacting wavelength, metalenses with adjustable focal length, dynamic holograms, tunable color filters and intelligent thermal management can be envisioned.

Reconfigurable metasurfaces can undergo simple and reversible transitions with large contrasts in properties upon switching without requiring continuous energy input, with switching timescales suitable for the device application. Current strategies to reconfigure metasurfaces include approaches based on thermal actuation, mechanical tuning, field-effect tuning, structural contrast-induced tuning and optical tuning. Among these strategies, thermal actuation and mechanical tuning are conceptually relatively the most straightforward as they enable direct adjustment of the metasurface configuration. For example, a thermally actuated tunable lens that exploits the elastic response of PDMS has been demonstrated to change focal length change by up to 852 μm via thermal expansion and contraction of the PDMS substrate [23]. Mechanical tuning also typically exploits elastic substrates, and uses mechanical stain to tune the distance between resonators. For example, by incorporating an array of amorphous silicon nanoposts in a PDMS substrate and stretching it uniformly, a change in excess of 952 diopters in optical power was achieved [24]. Similarly, plasmonic nanostructures have been embedded in a PDMS substrate. Upon stretching the substrate, the position-dependent phase discontinuity of the metasurface was tuned; control over this property is useful in optical devices like ultrathin flat zoom lenses [25]. These examples demonstrate simple reconfiguration mechanisms, but are limited by the substrate material properties, the fact that switching processes are not always fully reversible, and relatively long transitions times. Furthermore, since these approaches rely on strain of the substrate, the relative positions of the embedded constituents remain the same before and after the reconfiguration, limiting the functionalities that can be accessed. In other approaches, advanced fabrication methods have been exploited to integrate nanodevices into metasurfaces. For example, an electrically reconfigurable metamaterial that exploits the elastic properties of a nanoscale-thickness dielectric membrane and electrostatic forces in a planar plasmonic structure was demonstrated. Pairs of gold nanostrings bend embedded within the structure bend towards one another when an electric field is applied at the terminal of the nanostrings, changing the EM response of the structure. In the near-IR range, the transmission, reflection and absorption spectra of the metamaterial redshifted by 20% when the device switched, leading to 250% transmission changes for wavelengths around 1.2 μm and 110% reflectivity changes for wavelengths around 1.6 μm [26].

While these designs afford rapid switching, they require fabrication of nanocircuits into the system, and need continuous energy input to maintain the second state. Fast and controllable processes can also be developed by integrating microelectromechanical systems (MEMs). For example, one system exploits two metasurfaces in a doublet lens design, with one surface placed above the other. A change in optical power of more than 60 diopters (~4%) resulted from a 1-μm axial displacement of one the surfaces actuated with a MEMs device [27]. Although this switching process is fully controllable and does not require constant energy input to maintain the second state, it requires careful alignment and a sophisticated actuation system.

Other strategies focus on changing the EM environment of the metasurface unit cells to induce a spectral shift of the resonance; various materials, such as conductive oxides, graphene, and phase change materials (PCMs) have been used to induce changes upon external stimulus. For example, in n-doped semiconductors, a considerable carrier dependence of the refractive index has been demonstrated in a metal-oxide-semiconductor (MOS) capacitor in the visible and near-IR spectral range [28-30]. By integrating a metasurface with such a MOS structure, reconfigurable metasurfaces based on the refractive index change in the semiconductor layer can be used to tune the transmission, reflection, and phase modulation. Graphene is also often integrated with plasmonic metal nanostructures to design metasurfaces that can be electrically tuned to change metasurface transmission and to shift spectral resonance. Structural contrast-induced tuning has been achieved by exploiting PCMs in metasurface design. For example, by combining $(GeTe)_x$—$(Sb_2Te_3)_{1-x}$ (GST) based films with a sub-wavelength-resolution optical writing process, a variety of devices can be made such as a visible-range reconfigurable bi-chromatic and multi-focus Fresnel zone-plates, a super-oscillatory lens with sub-wavelength focus, a grey-scale hologram and a dielectric metamaterial with on-demand reflection and transmission resonances [31]. However, the switching time in these systems is limited by the rate of temperature change, and these devices have limited spatial resolution.

There are also distinct strategies that allow ultrafast tuning of the interaction between the incident wave and the metasurface. One strategy involves impinging two wave onto the same surface using various methods such as pump-probe methods [32,33] or by interfering two coherent counter-propagating beams impinging on a metasurface to control the two beams emanating from both sides of the surface [34]. Through optical tuning, ultrafast modulation in the THz can be achieved [35,36]. While all of these studies demonstrate the promise of reconfigurable metasurfaces at different length scales, they suffer limitations associated with imperfect reversibility, the need for constant energy input, limited extent of reconfigurability, or the need for advanced nanofabrication and actuation methods.

Other strategies exploit tunable optical responses of NLCs by incorporation of a NLC film atop a passive, fixed metasurface to control the refractive index and tune system response. This technique, in nature, is similar to exploiting PCMs, as discussed above. We review this strategy separately to distinguish it from our approach.

NLCs have uniaxial birefringence that can be electrically controlled by re-orienting the liquid crystal via an applied electric field by the Freedericksz' transition. Additionally, NLC lose their order and birefringent properties when melted to the isotropic state, allowing for thermal tuning by melting [37]. Metasurfaces incorporating NLC films can tunably change polarization of incident waves upon reorientation of NLC with an electric field [38-40], or can change refractive index by of the metasurface environment by melting the NLC [41-43]. These approaches yield reversible changes in EM response, but require constant energy input to maintain the second state. Furthermore, the role of NLCs is limited to tuning the refractive index or polarization of incident light, which limits their impact in applications. While our approach exploits NLC, the role is different; one can use the physics of NLCs to define elastic energies to control precisely the position of scatterers, as described below.

Uniqueness of the Disclosed Approach

We propose an approach to control metasurface response with pixel level resolution, using physically actuatable elements that can be addressed in simple settings that are fully reversible, and do not require continuous energy input to alter system response.

Background: Lock and Key Interactions of Colloids with Wavy Walls

Colloidal particles, immersed in NLC, interact via elastic energies with each other and with bounding walls of vessels, allowing control over colloid placement in confining vessels. These effects remain significant for colloid diameters ranging from tens of microns down to hundreds of nanometers. Typical wall-colloid interaction energies are of order $10^3$-$10^4$ $k_BT$ for microscale colloids, and in excess of $10^2$ $k_BT$ for colloids of ~100 nm. Furthermore, these interactions are independent of the material properties of the colloid, depending only on the colloid shape, the vessel boundary shape, and the colloid and bounding vessel surface chemistry.

A colloid, placed within a confining volume with curved walls, moves via elastic energy in the NLC to docking sites to minimize the elastic energy in the domain. This interaction, referred to as an elastic lock-and-key interaction between the colloid and the boundary, has been shown recently by the PI as a tool to direct both spherical [44,45] and anisotropically shaped colloids to preferred locations. This elastic interaction relies on several effects. Firstly, NLC molecules adopt alignments either parallel to or perpendicular to bounding surfaces depending upon surface treatment, referred to as planar and homeotropic anchoring, respectively. In this example interaction, the anchoring on the colloids and the wavy wall is homeotropic, ensured by a chemisorbed layer of a particular surfactant in their surfaces. Near the colloid and wall, the NLC pays an energetic penalty if it is not perpendicular to the surfaces, whereas far from the colloid and the wavy wall, the NLC pays an elastic free energy penalty if it is not uniformly oriented. In the simulation and in experiment, the wavy wall, colloid and NLC are highly confined between two planar bounding surfaces above and below, each with oriented planar anchoring. The minimum energy state for the system is found by minimizing the elastic free energy (the Landau-de Gennes free energy functional) to minimize the cost for distorting the director field and the anchoring energy imposed on the surfaces. (See elsewhere herein for details).

The simulated director field, or mean direction of the NLC molecules, is shown in FIGS. 2A and 2B as headless vectors. The colloid forms a topological defect in the director field, requiring a companion topological defect, a site where the NLC loses its order. In this highly confined setting, colloids with homeotropic anchoring have a Saturn ring companion defect, shown in FIG. 2. Because of the symmetries of this structure and its far field behavior, this colloid and ring are termed an elastic quadrupole. While these such structures have analogies to their counterparts in electromagnetics, their physical origin is quite distinct.

The colloid and the wavy wall introduce distortions into the surrounding NLC. The distortions in the director in FIG. 2A include splay distortions (divergence of the headless vectors) and bend distortions (curved headless vector fields) near the colloid and the wall. These distortions are minimized when the colloid is adjacent to the wall (see FIG. 2B). This free energy minimum dictates the colloid docking site along the wall. In experiment, the colloids and NLC are confined in a horizontal sandwich cell made with glass slides on the top and bottom with spacing slightly larger than the colloid diameter.

A long, wavy wall is made by lithography using SU-8 epoxy resin. The experiment is shown in panel FIG. 2C; the colloid center of mass moves along the path shown by the yellow contour to dock adjacent to the wall, driven by the elastic energy in the domain. This docking is entirely reversible; a 8.6 μm diameter ferromagnetic colloid was repeatedly removed from the docking site by an external magnetic field; upon removal of the field, the colloids dock again. These colloids have been repositioned using external magnetics field gradients of ~20 mT strength, moving with velocity ~1 μm/s. Colloid motion near the wall is hindered by viscous drag and driven by elastic forces of several picoNewtons with typical velocities, absent external fields of 0.17 μm/s. These initial studies did not focus on rapid switching. In FIG. 2D, the lock and key interaction of an ellipsoidal particle with a wavy wall is shown, again mediated by the elastic energy in the NLC, with similar physical origins. Since colloids can be resonators or scatterers in metasurface design, this ability to control their position using tunable interactions could be a particularly powerful means to influence device operation.

The Central Concept to the Disclosed Approach: MEPs

Introduced here is the concept of MEPs as reversible, addressable pixels, each containing a single colloid. The geometry and boundary energies of the MEP volume are designed to impose two features useful to their operation. (1) There should be two or more stable sites for the colloid enforced by the NLC elastic energy. For anisotropic colloids, different orientations can be enforced. The distances between these sites for spheres or disks, and the angles spanned for anisotropic colloid orientation are a degree of freedom within MEP design. (2) The movement of the colloid between stable states must require significant energy input, so that switching occurs only under application of external switching fields of sufficient strength. For illustration purposes only, we focus initially on bistable systems, as one can design confining geometry and energy landscapes to minimize switching time at gentle enough field strengths to avoid disruption of the device function.

Design of Reconfigurable Metasurfaces and Devices that Exploit MEPs

One can design metasurfaces based on the judicial placement of MEPs within arrays of fixed scatterers. This provides possibilities for designing reconfigurable EM devices in an on-demand fashion by changing pixel configuration. In particular, one can use metal or metal-coated spherical or disk-shaped colloidal particles as scatterers within each MEP. By moving colloids within each MEP, one can tune the pitch between scatterers and change their spatial arrangement e.g. to form square arrays, stripes, or other structures, to significantly influence the spectroscopic performance of the metasurface. With the scatterer located in one of two different stable positions, the structure can interact differently with identical incident EM waves, e.g. to tune absorption/transmission peaks. Anisotropic colloids afford new degrees of freedom, for example, to tune polarizability.

EM Fundamentals Review

The interaction of classical EM waves and structured matter is governed by Maxwell's equations which describe the spatial-spectral distribution of the wave as a function of EM properties of the surrounding media. To alter or modify this interaction, two degrees of freedom are available. First, changing the material properties in the structure (e.g. refractive index, chirality, absorption coefficient, dispersion, etc.) can result in a new set of results, thus allowing us to control the distribution of the EM wave. Second, changing the composition of the device (e.g. shape, size, orientation, etc.) can modify the spatial dependence of the equations and thus provide another means of controlling the EM response of the system.

The field of metamaterials is motivated to create artificial materials with novel EM properties that would allow us to control the EM field distribution in a bulk material beyond the availability of natural materials and for various applications as discussed elsewhere herein. Metasurfaces are the two-dimensional subset of metamaterials that provide a more delicate way of controlling EM waves. Rather than modifying the bulk EM properties of the medium, metasurfaces modify the boundary condition between two media, thus changing the response of the system based on the new boundary condition they impose.

For instance, a Gaussian beam propagating in free space can be focused into a diffraction-limited spot by using a glass lens (i.e. changing the refractive index in a bulk medium placed in the path of signal). A metasurface, on the other hand, can produce a similar effect if the surface elements are properly designed to provide the necessary boundary condition to locally transform a diverging beam into a converging one between two air half spaces.

Depending on the application, surface elements may alter phase, amplitude, or polarization of the incident wave. Because the effect is desired to be achieved over a small thickness, surface elements typically operate close to resonance, so that they are capable of efficiently changing the local properties of the surfaces. In the linear regime, EM devices are scalable to other frequency ranges given that similar scattering properties (boundary conditions) can be made available at the new frequency regime. In our structures, this can be easily achieved through modification of the size of the MEPs for the target frequency. Exemplary designs use micron sized particles which provides reasonably strong interaction with IR waves over the surface. However, because the physics on the MEPs are robust for colloids with radii of order 100 nm, nanoparticles can be used both in form of plasmonic particles to exploit plasmon resonances or as dielectric resonators to create strong and local surface wave-matter interactions.

Exemplary Results

Simulated MEP Design for Spherical Colloids

Provided are "peanut" shaped MEP (i.e., with multiple lobes) to generate elastic attraction between the colloids and walls with complementary curvature at either end. Landau-de Gennes simulations yield the three-dimensional director field and the NLC elastic energy free energy as a function of colloid position within the MEP, shown in FIG. 3A, where the reference free energy is given by the minimum energy in the docking sites, and the origin of the coordinate system is defined for a colloid with its center at this unstable site. The NLC elastic energy in the system is symmetric about the center line with two energy minima. The colloids are attracted to the lobes at either end of the domain, where, as in the lock and key interactions, bend and splay from the wall and from the colloid are complementary, and, by positioning the colloid there, the distortion of the NLC director field is minimized.

Colloids are repelled from the midpoint, where the wall curvature induces a splay in the director field that is antagonistic to the splay in the director field generated by the colloid. As noted elsewhere herein, Landau-de Gennes simulations are computationally costly, and are performed for systems far smaller than the planned experiments, i.e. for particles roughly 225 nm in diameter, with energy barriers between the two states of 150 $k_B T$. A rough rescaling of these results suggests that the energy barrier between states for micron scale colloids is ~0.650 $k_B T$, much greater than the thermal energy. Thus, the particles are trapped in those locations absent an external switching energy source. There are several degrees of freedom in this system. One can, for example, make lobes with different curvatures, forming stable states with differing energy minima and with asymmetric switching requirements. One can elongate the peanut axis, allowing greater translation of the colloids. One can make multi-lobed structures, providing multiple minima. This initial design can be modified to facilitate application of electrophoretic switching fields, to reduce viscous drag, and to design energy barriers and elastic energy minima to promote rapid switching and stable states.

Simulated MEP Design for Elongated Colloids

Anisotropic particles, like ellipsoids, bring another degree of freedom, namely their orientation with respect to the polarization of incoming EM waves, when designing devices. For example, a multiband sharp plasmonic electromagnetic absorber with polarization-adjusting capability has been demonstrated using an array of sub-wavelength elliptical disks [47]. We have designed a MEP to control the angle of an elongated, ellipsoidal particle (FIG. 3B). This design features an hourglass-shaped opening, with attractive rounded corners with curvature similar to the ellipsoid tip, repulsive planar top and bottom walls, and a constricted waist at the midplane. Without being bound to any particular theory or embodiment, a waist can be where the boundary curvature changes.

The waist of the hourglass sterically limits the rotation of the major axis of the colloid in the plane of the surface to +/−45° about the y axis. The attractive rounded corners define the maximally tilted states as the elastic free energy minima. For ellipsoids in these orientations, the distortion in the NLC director field is minimized; in particular, the splay field forced into the domain from the highly curved colloid tip is similar to that from that highly curved smoother corner.

The energy barrier between the two states results from the strong distortion in the NLC for colloids aligned along the y axis, placing the highly curved colloid tip near the planar wall, a highly repulsive situation. Even at the small scale of the simulation (where the colloid is again on the scale of $10^2$ nm), the energy barriers are ~$10^3$ $k_B T$. Rescaling the simulation to estimate the energy barriers for an ellipsoid with major and minor axes 2a=1.8 μm, 2b=0.45 μm, the energy barrier between the tilted alignments is in excess of $10^4$ $k_B T$, significant enough to fix a colloid in a desired tilted configuration, and small enough to be overcome by a switching field. These predicted fields are similar to those overcome in prior work, described elsewhere herein. One can extend such designs to dictate other alignments and switching energies.

Metasurface Design for Spherical or Disk-Shaped Particles

One can exploit control over particle position and orientation within MEPs to develop metasurfaces in the form of large two-dimensional arrays that can be reconfigured with external EM switching fields. In these examples, one can rely on changes in the EM wave interaction with the scatterers as they are brought in closer proximity upon switching from State 1 to State 2. Without being bound to any particular theory, one can anticipate that the EM response of spheres and disks are similar. However, simulation of disks is easier, as it obviates the need to resolve the region of contact between the sphere and the solid substrate.

Figure 4:
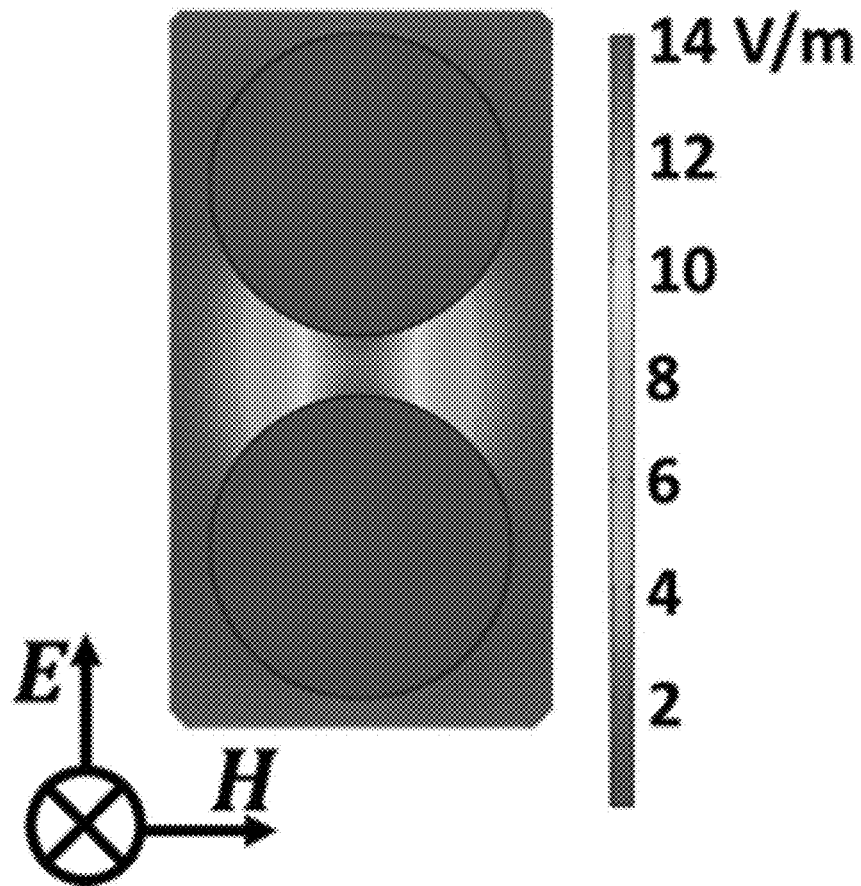
FIG. 4—'Hot spot' between a dimer of particles. Electric field distribution around circular disk dimers of silver particles. 2a=1 μm, H=0.5 μm silver disks at λ=3.476 μm.

Thus, in the non-limiting EM responses discussed below (and solely for illustration purposes only), one can simulate circular disks and elongated disks rather than the responses of spheres and ellipsoids. In our periodic reconfigurable metasurfaces, we do not merely expand or compress the lattice to alter the fractional area covered by the scatterers and their interaction with EM fields. Rather, as we move particles in the MEP, the particles go from monomeric to dimeric form. Thus, one can turn on and off the 'hot spot' between the dimerized particles as shown in FIG. 4, enhancing their interaction with the EM field. Furthermore, the dimers are formed with particular alignments, dictated by the arrangements of the MEP. The anisotropy of the dimer yields polarizing effects in addition to strong coupling. By judicious design of MEP placement, one can also change the lattice constant and the symmetries of the particle arrangements.

Reconfigurable Narrow-Band Filter

Figures 5A, 5B:
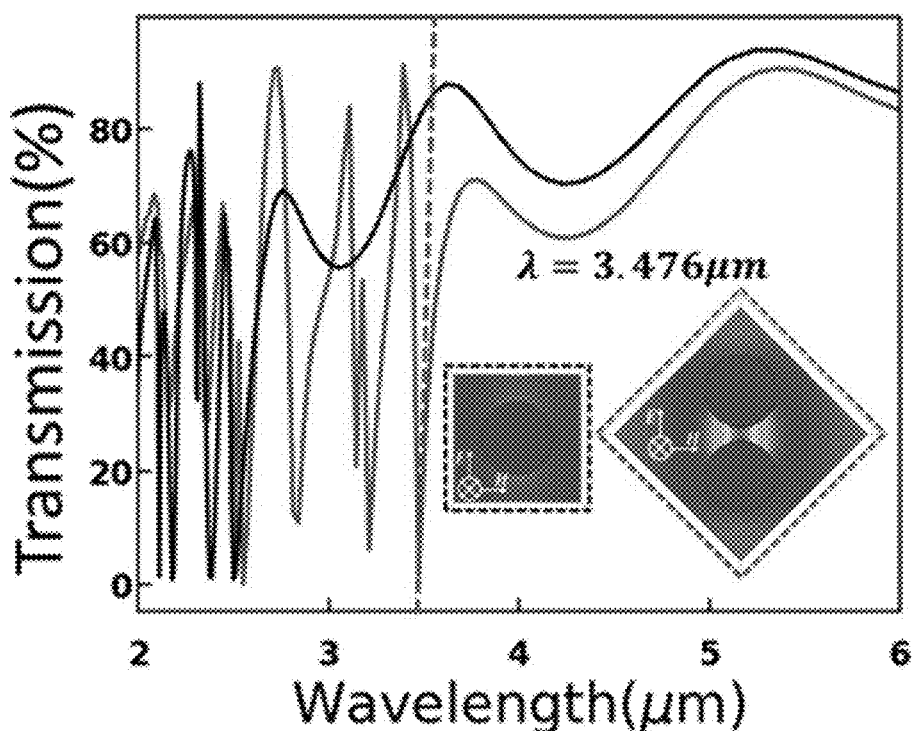
FIGS. 5A-5B—Design of reversible narrow band filter FIG. 5A. Schematic of metasurface with MEPs (red) and fixed pixels (blue) that can toggle from a square lattice of individual particles (State 1) to a square lattice of particle pairs (State 2), changing lattice constant and the scatterer properties.

The metasurface contains two kinds of pixels, blue and red, arranged in a checker-board pattern to form a square lattice with lattice constant L, shown schematically in FIG. 5A. The blue pixels represent colloids that cannot move. The red pixels are peanut shaped MEPs with major axis aligned along the y axis of the surface. Each MEP contains a single metal or metal coated particle positioned in the upper lobe of the peanut, State 1 of the surface. The switching field can be used to move all colloids in MEPs in the −y direction. This is State 2 of the surface; which now contains dimers arranged in a square lattice of lattice constant $\sqrt{2}L$.

One can consider silver particles of diameter 1 μm, selected because of the relative ease of working with colloids of these dimensions in experiment to generate proof of concept metasurfaces with EM responses in wavelengths from 2-6 microns. In State 1, the colloids are well separated, and the incident wave is predominantly transmitted through the metasurface (~81.9% at 3.476 μm); only a weak dipolar response is excited in each particle (inset, FIG. 5B). In State 2, EM polarized waves in the IR interact with dimers, which form strongly interacting EM dipoles (inset, FIG. 5B). These changes yield strong differences in interaction with incident waves; changes in transmission, reported in FIG. 5B for incident waves polarized along the y axis are greatest for λ=3.476 μm for which the change in transmission ΔT=80.5%.

As this effect occurs only over a narrow range of wavelengths, this metasurface is a reconfigurable narrow-band filter. Such structures can be useful in applications like notch filtering and high-resolution imaging and sensing [48-52], for which a narrow-band absorption would be desirable. While this simulation includes losses from the silver, potential losses from the NLC are not included here; one can use the NLC E7 which has weak losses in the IR region. Further, one can note that the high quality-factor (Q) of the resonance can cause sensitivity to any source of loss or fabrication imperfection, which is inherent to the nature of a high-Q phenomenon. Above 3-4 micron, however, one can observe couple of sooth and low-Q variations in the transmission that are expected to be robust to possible material losses.

Reconfigurable Reversible Broad-Band Filter and Polarizer

One can use the same elements to make a reversible broad band filter. One can form a structure of alternating fixed pixels and MEPs in a checker-board pattern. However, rather than orienting the MEP major axis along the y-axis, one can arrange MEPs with major axis oriented diagonally. While State 1 is similar to the previous example, the alignment of MEPs allows us to create a distinctly different arrangement of particles in State 2. Depending on the location of the colloid in the MEP, one can either form a square lattice of lattice constant L in State 1 or toggle to form chains of particles aligned diagonally with interchain spacing $\sqrt{2}L$ in State 2 (shown in FIG. 6A).

Figures 6A, 6B, 6C:
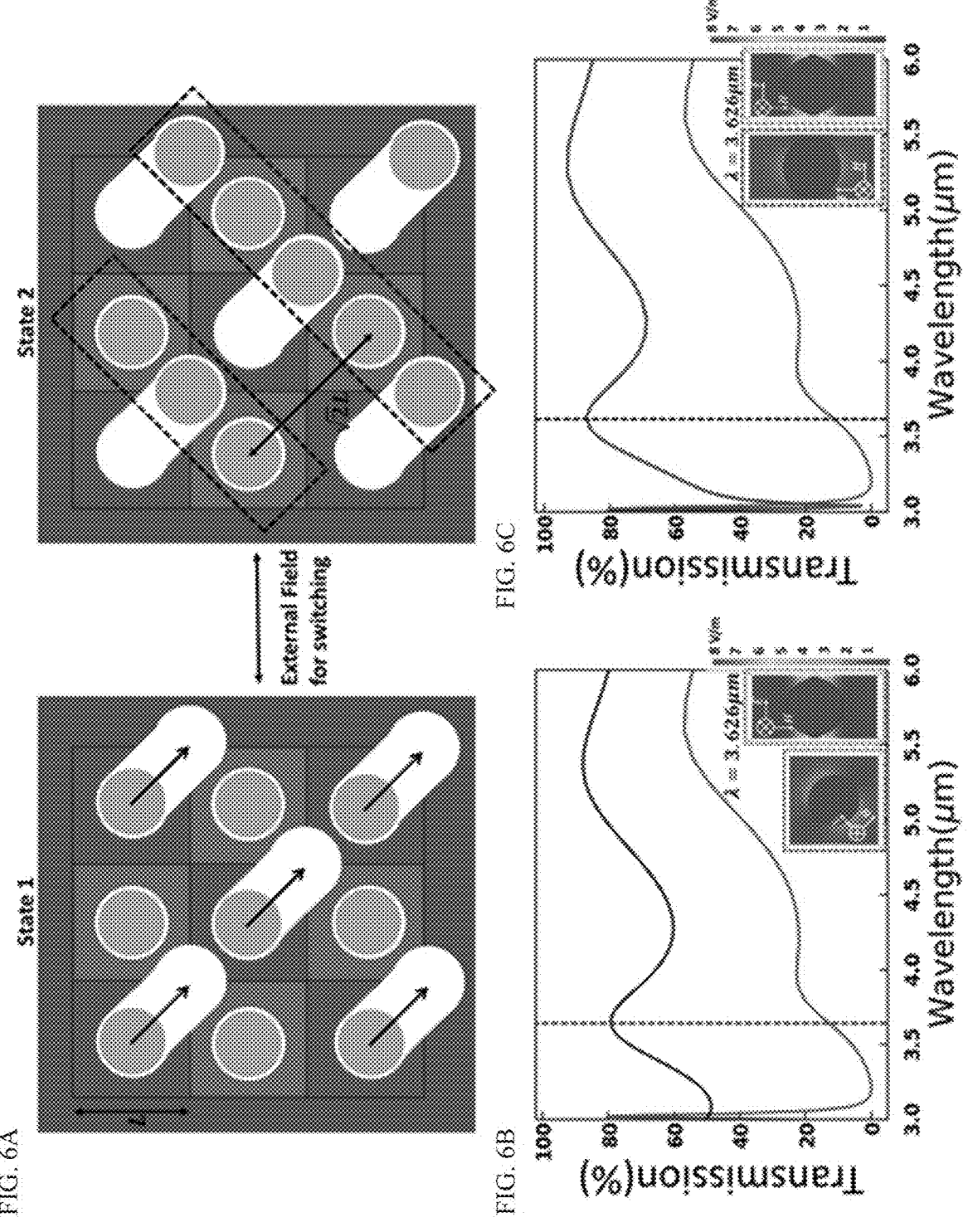
FIGS. 6A-6C—Reconfigurable broad band filter and polarizer FIG. 6A. Metasurface that toggles between a square lattice of individual particles (State 1) and a rectangular lattice of particle chains (State 2).

The interparticle distance can be tuned by the size of the particle and thus allows us to control the coupling strength between particles as well as the lattice constant to particle diameter ratio. Due to the square lattice, the operation of this surface in this initial state is independent from the polarization of the incident wave. However, in State 2, the response depends on polarization. FIG. 6B compares the transmission through the square array (State 1) and particle chains (State 2) for an incident EM wave polarized along the chains in the mid IR region. Here, the distance between the particles forming the chain is one tenth of the diameter of the particles. The large change in transmission between the states is attributable to the strong electric field coupling of the particles in the chain, which decreases the transmission by over 75%. Interestingly, and quite different from the previous example, the continuous chain structure supports a broadband decrease in transmission partially due to the smaller period in the State 2.

Because this interaction depends on the polarization of the incident wave, the configuration in State 2 is both a broadband filter and a polarizer. Indeed, for incident wave polarization perpendicular to the chain, the wave excites electric dipoles perpendicular to the chain; the disks in neighboring chains are too far from each other to couple strongly, and changes in transmission are weak; this is evident by comparing the black line in FIG. 6B to the blue line in FIG. 6C.

Figure 7B:
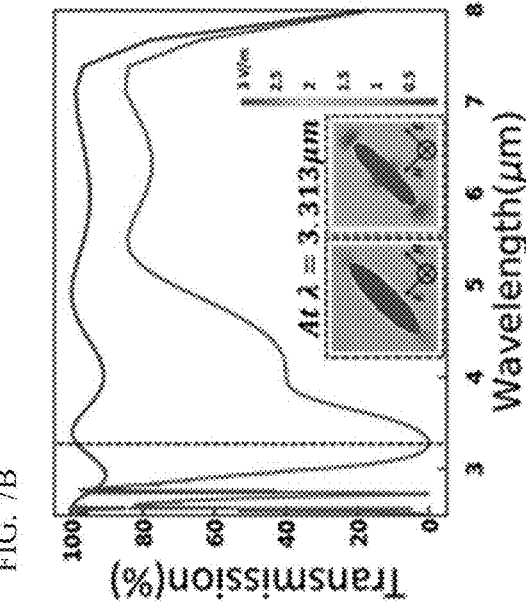
FIGS. 7A-7B—Reconfigurable polarizer and broad band filter FIG. 7A. Schematic of metasurface of uniformly aligned, tilted ellipses with representative spacing. The orientation of ellipsoids can be switched from –45° (State 1) to 45° (State 2) as shown in FIG. 7B. The EM wave propagates normal to the surface and the electric field is polarized along the major axis of the particle in one state and along the minor axis in the other.
Figure 7A:
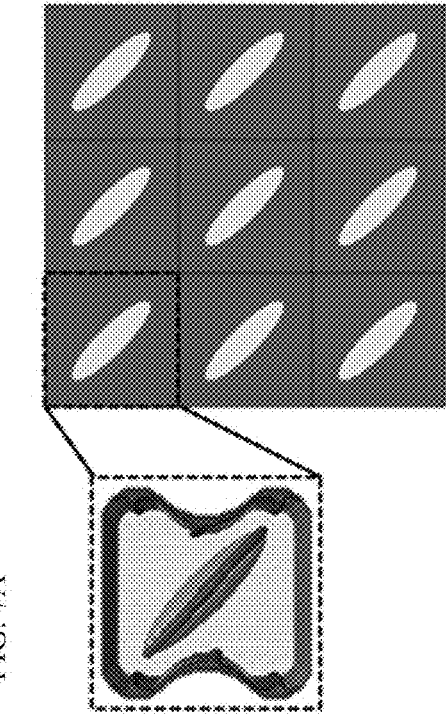

Metasurface Design for Elongated Particles: Broad-Band Filter and Reconfigurable Polarizer This metasurface design contains only one type of pixel; the MEPs that control the orientation of elongated colloids within them, with stable State 1 at 45° and State 2 at −45°. Upon application of the switching fields, the angle of all particles on the surface can change. One can simulate the EM response of silver elliptical disks within a square array of MEPs as a function of the orientation. The two states have distinctly different transmission spectra (see FIG. 7B, details in figure caption) when interaction with a similar incident EM wave. For incident waves polarized along the major axis of the particle, an electric dipole is excited along the chain of ellipses which greatly enhances reflection, thereby reducing the transmission of the surface. However, when the electric field is along the minor axis of the ellipse, the electric dipole is also along the minor axis with weak interactions with the incident wave in the IR region. This surface is a reversible broad-band polarization filter, as the transmission of the surface can be tuned by switching between the two states (FIG. 7). It also functions as a switchable polarizer for an unpolarized incident wave.

MEP Design, Fabrication and Demonstration of Reconfigurability

One can fabricate arrays of colloid- and NLC-filled MEPs, characterize MEP bistable states, energy barriers, required switching field strength and duration, and switching times. Arrays of MEPs can be fabricated lithographically and studied in a sandwich cell configuration with electrodes for electrophoretic switching; this structure can be placed under an optical microscope for the purpose of refining control over the colloid position.

Bistable MEPs for Spherical or Disk Shaped Colloids

Figure 8A:
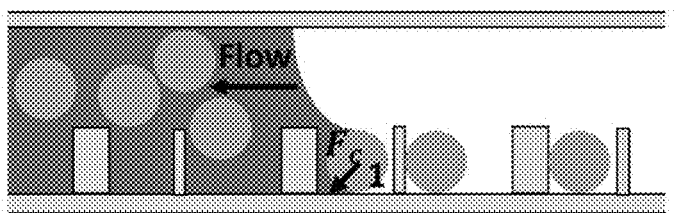
FIGS. 8A-8B—Capillary Assisted Assembly Method. Isolated particles are swept into a confining volume from suspension by a receding meniscus.
Figure 8B:
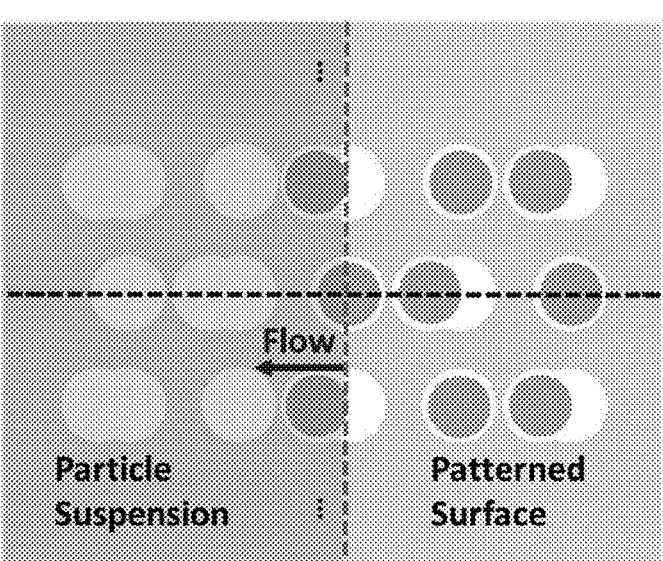

Designs on a so-called peanut shaped MEP can be adjusted regarding boundary curvature and MEP length: particle diameter to dictate energy landscape and distance between colloids in stable sites. One can fabricate arrays of MEPs using lithographic processes on a SiO2 substrate. MEP walls and the SiO2 substrate can be treated to impose homeotropic anchoring using known chemistries; the top surface can have planar anchoring to facilitate fabrication. Metallic colloids, e.g. silver coated silica colloids of diameter ~1 micron (Cospheric LLC, USA), can also be treated to impose homeotropic anchoring and to impart charge to the colloid surface that we exploit to manipulate its position. The top surface can be a glass coverslip, treated to give oriented planar anchoring. Furthermore, to reduce switching electric fields and viscous drag, a small gap can be introduced between the MEP surface and the lid. One colloid can be placed within each MEP as they are filled with NLC adapting a capillarity-assisted assembly method, as shown in FIGS. 8A and 8B. Without being bound to any particular theory or embodiment, one can modulate the anchoring strength by, for example, using surfactants with differing alkyl chain lengths; as one example, one can use octadecyltriethoxysilane (C18) and ethyltriethoxysilane (C2) to form self-assembled monolayers (SAMs) on the top and bottom of the cells. Without being bound to any particular theory or embodiment, although the precise molecular mechanism for anchoring is not known, the nematogens may align and interact cooperatively with the alkyl long chains. In these mixed SAMs, the density of alkyl chains is highly reduced, and one may hypothesize that the surface anchoring strength is also reduced.

By tailoring capillary forces from the receding fluid meniscus, isolated particles can be placed in geometrically complex traps or confining volumes from a suspension. One can use the NLC mixture formulated for application over the wavelengths of interest, E7 (Merck) with ordinary and extraordinary refractive indexes, $n_o$~1.5, $n_e$~1.7, respectively, in the mid-IR spectral range [54]. Furthermore, E7 has a high transmission rate (more than 80%) in most of the mid-IR spectral range despite a combined peak at ~2800-3000 cm$^{-1}$ due to the symmetric and asymmetric stretching of the CH bond and another very narrow peak at ~2226 cm$^{-1}$ due to the C≡N stretching [55]. The higher index of refraction of E7 compared to air used in the preliminary simulations above can red shift the peaks in the transmission spectrum [56]. Simulations confirm that the NLC energy landscape retains the signature behavior of two stable loci separated by significant energy barriers for a micron scale particle for a gap between lid and surface of ~200 nm. The colloid is elastically repelled from the planar top and bottom surfaces, preventing deleterious adhesion.

Once the vessel is assembled, at either end of the apparatus, two aluminum coated strips that serve as both spacers and electrodes can be exploited to form an in-plane electric field to drive the colloids electrophoretically from one docking site to another. A DC electric field applied across the two aluminum coated spacers moves the colloid from one state to the other, recorded via optical microscopy. In linear regimes, micron scale colloids move at ~0.4 diameters per second in fields of 8 kV/m. Furthermore, highly non-linear responses are reported for colloids with elastic polar companion defects in particular alignments. Switching fields are orders of magnitude below the threshold for the Freedericksz' transition (~$10^5$ V/m), so switching can be resisted by NLC elastic energy barriers, and facilitated by the attraction to stable sites when that barrier is overcome.

The EM response of the colloids in the dimerized states on which the metasurfaces rely require that the colloids be quite close to each other. For example, in the metasurface designs given in preliminary results, the simulated space between 1 micron colloids in the coupled states was 100 nm-200 nm; at greater separations, the hot spot of the coupled dimers decreases. To achieve strong EM coupling, one can form MEP designs that allow particles to be sufficiently close by tailoring the radii of curvature of MEP walls and by fabricating MEPs with thin walls. The required resolution can be achieved using e.g. E-beam lithography or 3D direct laser lithography, which have resolutions within 10 nm.

Figure 9:
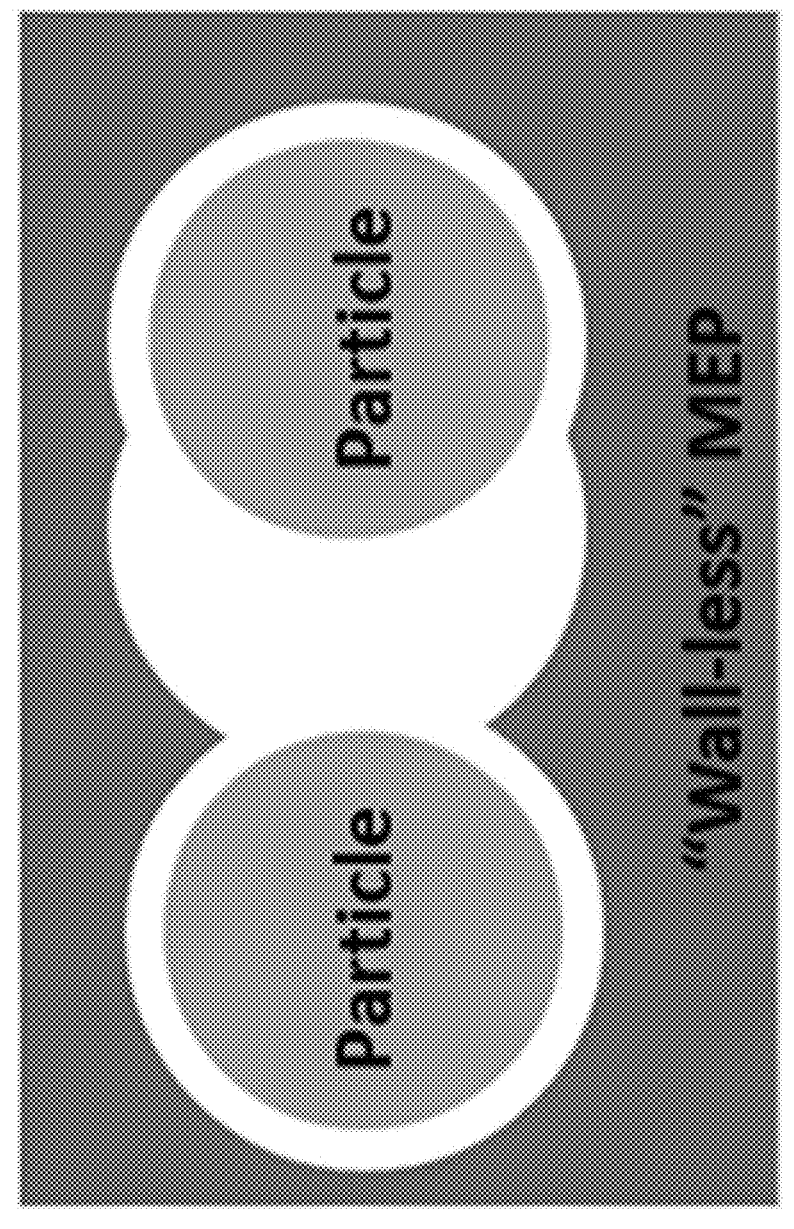
FIG. 9—"Wall-less" MEP schematic. To place particles in close proximity, the particle in the left well is confined, while the particle on the right can move from the right well to the middle well under an external field.

In simplest realization, the fixed colloids are spherical colloids in round holes. One can engineer fixed colloid confinement e.g. to include "wall-less" structures (as shown in FIG. 9) or other variants, allowing the mobile colloid to approach closely. One can also use ferromagnetic colloids which can be moved using applied magnetic fields.

MEPs for Elongated Colloids

Elongated colloids, e.g. ellipsoids and elliptical disks, can be fabricated by 3D direct laser lithography before coated with a layer of nickel. Another layer of silver can then be sputtered on top of the nickel layer. Those particles can be magnetized using a strong permanent magnet along the major axis of the particle before being release from the substrate using ultrasound. Then the particle is washed and treated to impose homeotropic anchoring on their surfaces after which they can be dried and dispersed in NLCs.

Details of the fabrication and surface treatment of the particles are found elsewhere herein. One can fabricate MEPs to control the angular displacement of elongated colloids. To switch between two states, external electric or magnetic fields are used to locally translate or rotate the particle in the pixel and those fields are turned on only during the switching time to overcome the energy barrier.

EM Response of MEP Interacting with Incident Waves

One can characterize individual MEPs using darkfield scattering spectroscopy similar to the one described in to characterize the interaction between the incident IR wave and the structure. In particularly, one can collect the reflection-mode darkfield scattering using a carefully aligned IR objective. A collimated, filtered and unpolarized IR wave can be routed to the expander through an optical fiber bundle before being polarized using a rotatable broad-band linear polarizer and refocused on the sample surface by a condenser. Scattered light from the sample can be collected by an IR objective lens and then routed to a beam splitter. The waves coming out of the beam splitter can be routed to an IR camera for imaging and a spectrometer equipped with an IR detector for EM measurement.

Reconfigurable Metasurfaces

Metasurfaces can be fabricated guided by simulations like those above using MEPs arranged to give desired EM responses. The metasurface can be fabricated by lithographic process on a silica substrate selected for the required resolution. For surfaces with smallest feature less than 1 µm, either electron beam lithography (Elionix E-beam writer) or 3D direct laser lithography (Nanoscribe GmbH, Germany) can be used to fabricate the surface; for surfaces with smallest feature greater than 1 µm, UV contact lithography can be used with a predesigned chrome mask. After fabrication, the surface can be coated with silica using vapor deposition method before being treated with DMOAP to imposed homeotropic anchoring on the surface. The metasurfaces can be filled using the capillary methods and configured in the sandwich cell with electrodes as described above. Finally, the electromagnetic responses of the structure can be characterized with the reflection-mode darkfield scattering spectroscopy as previously discussed.

Gradient Metasurface Design

Figure 10A:
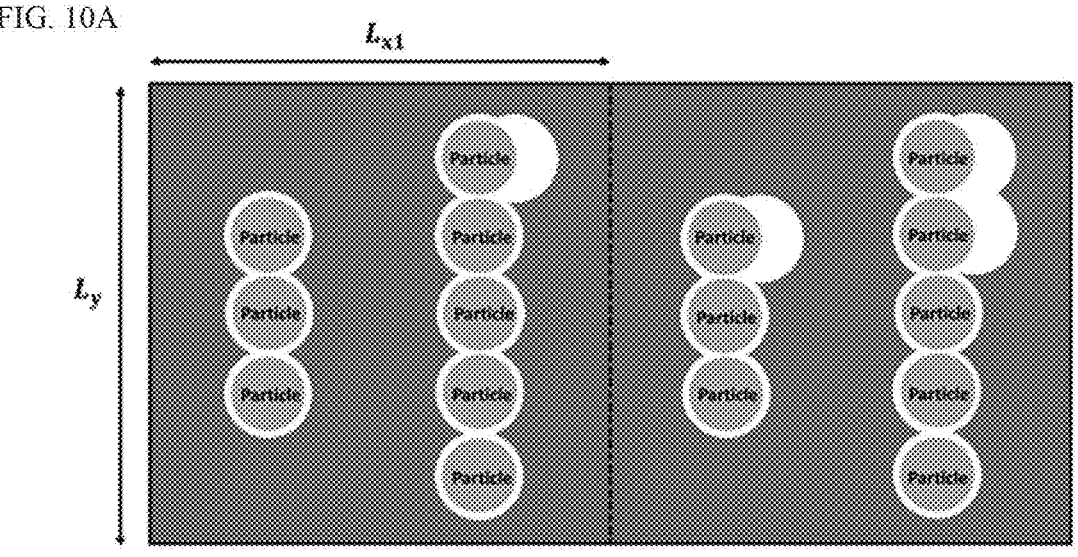
FIG. 10—Schematic of gradient metasurface. In State 1, the unit lattice structure consists of a trimer chain and a 5-particle chain and the lattice constant is $L_{x1}$ and $L_y$ respectively in the x and y direction. In State 2, after switching, the unit consists of a trimer straight chain, a distorted 5-particle chain, a distorted trimer chain and another differently distorted 5-particle chain. The lattice constant changes to $L_{x2}$ and $L_y$ in the x and y direction respectively.
Figure 10B:
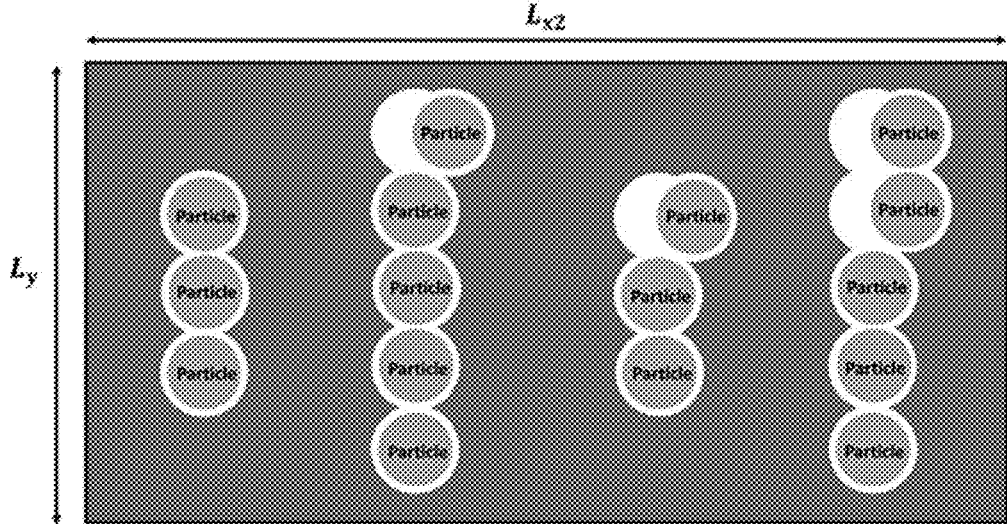

One can exploit bistable MEPs to achieve reconfigurability between different states of operation by controlling the position or orientation of scatterers within them. We have exploited these MEPs to change system behavior by simultaneously repositioning colloids within all identical MEPs in our designs. However, it is possible to envision even more complex ways to achieve higher levels of reconfigurability based on more complex spatial configurations of bistable MEPs or incorporation of multistable MEPs. For instance, metasurfaces can support advanced spatial wave shaping through careful adjustment of non-similar surface elements, typically referred to as gradient metasurfaces [17,58]. Unlike the structures shown in FIGS. 5-7, the particles on the surface are not necessarily identical in a gradient metasurface and they assume different shapes, sizes, and orientations depending on the application (e.g. lensing, beam deflection, holography, etc.). One can implement different MEPs on the same gradient metasurface to control the spatial wave front of the outgoing wave. For example, one can form a gradient metasurface as shown in FIG. 10, consisting of two particle chains in each unit cell at State 1. Each chain imprints a local phase on the incident wave front, depending on the positioning and the number of particles. Each of these particles may be positioned inside a MEP and moved to modify this local phase. For instance, here the particles are positioned in MEPs and move them with an external bias to create the State 2 of operation of surface as shown in FIG. 10B. This modification doubles periodic constant and creates four distinct scattering elements in each period with a new phase imprint. Similarly, N different segments can be created on the surface by using more variations of particle chains. Size, position, and orientation of several MEPs on the surface can be manipulated to achieve the desired two (or multiple) states upon external excitation.

Protrusion-Based Metasurfaces

A metasurface can also be formed by way of designed protrusions and/or resonators extending from a surface, which protrusions and/or resonators can be used to modulate the positions of moveable elements. Some illustrative, non-limiting examples are provided in FIGS. 11-14.

FIG. 11 provides an example metasurface designed with three elements, (1) metal coated circular microposts that act as fixed resonators in the structure, (2) sickle-shaped fixed microparticles that define bistable states for a colloid; and (3) a colloidal particle whose position can be modulated by application of an external field.

As shown in FIG. 11, an exemplary design can include an array of fixed protrusions (in grey) with circular and sickle-shaped cross-sections that define the metasurface domain. Particle resonators (in red) can be moved between State 1 and State 2 by application of an external field. As shown, State 1 features a square lattice arrangement of resonators while State 2 features a chains or multimer configuration in which particle resonators are in register with one another and also with fixed protrusions, e.g., such that multiple resonators and multiple protrusions lie along a given line, with the resonators and protrusions optionally arranged in an alternating or otherwise periodic fashion. In a case where the material of the posts interacts with EM radiation, the surface features both particle-particle and particle-post interactions. The lattice constant, dimensions of posts, and dimensions of particles can be tuned based on the wavelength of the incident wave.

FIG. 12 provides an alternative design that involves two functional elements: (1) a fixed star-shaped micropost that controls the orientation of an elongated colloidal particle (resonator); and (2) an elliptical resonator whose orientation can be switched between two stable states (as indicated by the red and blue dashed ellipses) between fixed star-shaped microposts.

The orientation of the elliptical particles can be aligned under an external field. In State 1, all elliptical particles are aligned along the vertical direction while in State 2, the particles are aligned along the horizontal direction. This change in resonator orientation leads to distinct EM responses upon interaction with linearly polarized incident waves.

As shown, a protrusion (i.e., a star-shaped micropost) defines a first concavity (1) along a first direction (1st Dir.), a second concavity (2) opening along a second direction (2nd Dir.) that is perpendicular to the first direction, a third concavity (3) opposite the first concavity and opening along the first direction, and a fourth concavity (4) opposite the second concavity and opening along the second direction. The plurality of protrusions can be periodically arranged.

As shown, a moveable resonator can define a major axis and a first end (1) and a second end (2) lying along the major axis. The moveable resonator can be positioned such that the application of an external field reversibly converts the component from one of a first mechanically stable state and a second mechanically stable state to the other of the first mechanically stable state and the second mechanically stable state.

As shown, in the first mechanically stable state, the major axis of the moveable resonator lies along the first direction and the first end of the moveable resonator is associated with the third concavity of a first protrusion and the second end of the moveable resonator is associated with the first concavity of a third protrusion. In the second mechanically stable state, the major axis of the moveable resonator lies along the second direction and the first end of the moveable resonator is associated with the fourth concavity of a second protrusion and the second end of the moveable resonator is associated with the second concavity of a fourth protrusion.

FIGS. 13 and 14 provide anisotropic geometries of resonators. For example, fixed anisotropic pillars, when coupled with movable particle resonators, can impart reconfigurability to classic L & T-style resonator, changing the handedness of these chiral elements. FIGS. 13 and 14 depict how a movable resonator (shown by red dashed lines) can be reconfigured between adjacent fixed pillar resonators (in grey) to form right-handed (State 1) or left-handed (State 2) L-style arrangements, as shown in FIG. 13. As State 1 and State 2 are mirror-symmetric, such switching will result in different EM responses when interacting with circularly polarized electromagnetic waves of opposite handedness. Similarly, T-style configurations can be designed as shown in FIG. 14.

As shown in FIG. 13, a fixed pillar resonator can define concavities that accommodate a moveable particle resonator. The concavities can, as shown in FIG. 13, lie relatively closer to an end (as measured along a major axis of the fixed pillar resonator) of the fixed pillar (or protrusion) resonator. In this way, a user can form so-called L-resonators, as shown in FIG. 13. Alternatively, concavities can, as shown in FIG. 14, lie relatively closer to or at the center (as measured along a major axis of the fixed pillar resonator) of the fixed pillar (or protrusion) resonator. In this way, a user can form so-called T-resonators, as shown in FIG. 14.

EXEMPLARY MATERIALS AND METHODS

Fabrication and Surface Treatment of Individual MEP and Particles

Fabrication and Surface Treatment of Individual MEP

Example metasurfaces can be fabricated by lithographic process on a silica substrate based on the required resolution. For surfaces with smallest feature less than 1 $\mu$m, either electron beam lithography (Elionix E-beam writer) or 3D direct laser lithography (Nanoscribe GmbH, Germany) can be used to fabricate the surface using high resolution photoresist. While for surfaces with smallest feature greater than 1 $\mu$m, UV contact lithography can be used with a predesigned chrome mask and a positive tone epoxy photoresist.

After fabrication, the sample is pre-cleaned with plasma etching and placed in a desiccation chamber connected to a vacuum pump. The chamber can be wiped with acetone and pumped down to reduce humidity to minimize debris hitting the surface and introducing imperfections. A drop of silica tetrachloride is pipetted from a syringe onto a glass coverslip placed adjacent to the sample. A vacuum is pulled for 7 minutes to carry out the chemical vapor deposition. Then, silanization is carried out by immersing the silica coated structure in a 3 wt % DMOAP for 10 mins. The structure is rinsed with deionized water and cured on a hot plate at 80° for 1 h to impose homeotropic anchoring condition on the surface.

Fabrication and Surface Treatment of Silver Coated Spheres and Elongated Colloids Silver coated silica spherical particle can be directly purchased from Cospheric LLC. Elongated colloids, e.g. ellipsoids and elliptical disks, can be fabricated by 3D direct laser Lithography (Nanoscribe GmbH, Germany) using the high-resolution photoresist IP-Dip. A Ni layer can then be deposited onto the surface of the particles by vertical electron beam deposition (Kurt J. Lesker Lab-18, USA). A silver layer can then be coated over the particle surface by sputtering (Kurt J. Lesker CMS18 sputter, USA). After fabrication, the particle can be treated with DMOAP to impose homeotropic anchoring condition. The particles are first washed 3× with DI water, centrifuging at 1960 rpm for 5 minutes each time. They are then placed in a solution of 3 wt % DMOAP, vortexed to mix for 30 min, and subsequently placed in oven at 80° for 1 hour to react. Once removed from the oven, they are washed again for 3× with DI water and dried overnight under vacuum at 90° before being redispersed into NLCs.

Surface Treatment of Top Cover Glass

Uniform planar anchoring can be imposed on the top cover slip. To do this, a polyamide filed is spin-coated at 4000 rpm for 40 seconds and then cured at 80° for 1 h before being rubbed gently with a velvet cloth in the direction of least resistance, 7-10× in one direction.

Fabrication of Alumina Coated SU-8 Spacer/Electrode

Two alumina coated SU-8 spacers can be made using contact lithography with a mask aligner in our lab (OAI 100) on a silicon wafer and then sputtered with alumina using a Lesker PVD75 DC/RF Magnetron Sputterer. After deposition, the alumina coated stripes can be released from the wafer using a blade. Two stripes can be places on two side of the MEP surface to serve as electrodes and a direct current from a function generator can be applied between two electrodes when switching.

Metasurface Fabrication Methods

The metasurface can be fabricated by using similar approach mentioned elsewhere herein. However, rather than making well separated MEP surface, one can make a MEPs and fixed scatterers in arrangements designed to give given reconfigurable functionalities with computer-aided design software (Layout Editor or Solidworks).

Simulation Details

NLC Elastic Energy Field

Numerical modeling provides insight into the NLC-director field in our confining geometries using a shared software [60]; related codes have been used extensively in our prior research [44-46,61-71]. We use the standard numerical Landau-de Gennes (Q-tensor) approach described in with a finite difference scheme on a regular cubic mesh, widely used to compute regions of order and disorder in bounded geometries through a global free energy minimization. The Q-tensor is a second-rank, traceless, symmetric tensor whose largest eigenvalue is the order parameter S in the NLC.

At equilibrium, the 3-D director field and the locations of defect structures for a given geometry are predicted. The nematic director field, a headless vector field (i.e., $-n=n$), represents the average direction of an ensemble of molecules of size comparable to the correlation length at any point in the system. Defects are defined as the regions where the order parameter S is significantly less than the bulk value. The mesh size in the simulation is related to the correlation length in the NLC, which does not scale with system size, and corresponds to 4.5 nm.

In FIG. 3, the simulation boxes of dimension 450 nm×450 nm×315 nm were used. In the peanut shaped MEP, spheres of diameter 2a=225 nm were simulated; for ellipsoids in hour-glass shaped MEPs, ellipsoids of major axis 360 nm and minor axis 90 nm were simulated. Homeotropic anchoring was imposed on the walls of the MEP and the colloid surface. Uniform planar anchoring conditions along the horizontal direction were applied on both top and bottom planes of the box. These can be varied to compare to experiment. Rather than imposing anchoring boundary conditions, we can also simulate anchoring energies using the Rapini-Papoular (or Nobili-Durand) anchoring potential. The energy landscape changes with system size for systems with similar geometries with all length scales increased proportionally with colloid radius. The total free energy consists of two parts, the phase free energy which captures the energy cost of the defect, and the gradient free energy which captures the distortion of the field. Defect energy grows with the linear dimension of the system, while the gradient free energy $\Delta E$ gradient has more complex scaling. For a very rough estimate, the NLC elastic energy can be scaled linearly in colloid radius a to estimate the depths of energy wells and barriers. A more careful study, changing colloid radius, and comparing the changes to an ansatz that includes a more complex logarithmic term, could give more precise estimates. These simulations provide other valuable guidance, including director fields, colloid metastable states near textured solid boundaries and energy gradients (forces) on the colloid. Notable, transitions in our experiments occur in creeping flow, absent inertia, and at negligible Erickson number. Thus, the elastic forces are quasi-equilibrium, and can be estimated, with appropriate caution concerning scale, from gradients of this energy profile.

Finite Element Simulation

All finite element simulations of metasurface EM response are performed with COMSOL Multiphysics software using the frequency domain solver with periodic boundary conditions. A silica substrate of 3.33 μm thick and an air environment was used in all simulations. One can include the properties of the NLC E7, which is relatively well behaved in the mid IR. In preliminary results, the disks were silver with diameter 2a=1 μm and thickness H=0.5 μm; incident waves were polarized along the lattice axes over spectral range of 2-6 μm. Silver ellipsoid-shaped disks with major and minor axes 2a=1.8 μm, 2b=0.45 um were studied in the metasurface that exploits elongated particles. In State 2, in all cases, incident waves are aligned along the major axis of the dimer pair for disks or along the stripes formed by oriented ellipsoids.

Additional Disclosure

As described herein, the bi-stability of pillbox and peanut pores illustrates how combining lock-and-key phenomena in nematic liquid crystal (NLC) with geometric design enables tunable MEP elements.

In the non-limiting examples herein, MEP pores are designed and fabricated experimentally using lithographic techniques and filled with 5CB, which is an NLC. The reconfigurability of colloids in pore and post MEPs is demonstrated experimentally using conductive 9 μm Ag-coated silica (Ag-Silica) and magnetic 8.74 μm CrO₂-coated polystyrene (CrO₂-PS) particles. In the non-limiting experimental studies presented, both electric and magnetic fields are used to reposition colloids and switch device states.

For electric field-enabled switching, LC cells were assembled using aluminum electrode spacers that were connected to an external DC source. This allows constant voltages to be applied along the length of the pores and posts to reposition colloids. FIG. 15 and FIG. 16 demonstrates the electric field-driven repositioning of Ag-Silica colloids in pillbox and peanut pores, respectively; this demonstrates a bistable MEP.

As shown, Ag-silica colloids translated towards the positive electrode. When the field was removed, the particles remain in a stable state defined by the nematic director field (State A, in FIG. 15). When the polarity of the electric field is reversed, colloids translate in the opposite direction. When the field is removed, the particles remain in a stable state defined by the nematic director field (State B, in FIG. 15).

In FIG. 16, after 1.00 s, a voltage less than 500 V is briefly applied to the pore and then removed. This yields the state at time 21.00 s (denoted by *), where the colloid is slightly displaced from State A. By time 41.00 s, the colloid spontaneously translates to re-establish State A. Without being bound to any particular theory or embodiment, this illustrates that external fields can, in some embodiments, be applied to provide a threshold energy in order to reconfigure the colloid between the energetically stable states. At time 101.00 s, the field is turned off before the colloid fully reaches State B. By time 121.00 s, the colloid has spontaneously translated to achieve State B. This displays that the colloid position denoted as State B is a local energetic minimum in the NLC landscape defined by the pore MEP.

Although the peanut pores in FIG. 16 are shown with only two (i.e., upper and lower lobes), it should be understood that a pore can include a plurality of lobes. Lobes can be opposed to one another, but this is not a requirement, as a confinement volume can include lobes that are offset from one another, e.g., a four-lobe confinement volume that includes lobes arranged in a cross pattern. Such a confinement volume can exhibit four stable states, with each state corresponding to a particle maintaining a stable position (without the application of an external field) in a particular lobe associated with that state. A system can be arranged in which two or more confinement volumes can be fluidically separated from one another and then placed into (and out of) fluid communication with one another.

FIG. 17 and FIG. 18 illustrate repositioning of $CrO_2$-PS colloids in pillbox and peanut pores, respectively, using a handheld magnetic probe, which handheld magnetic probe provides a local magnetic field which can reposition colloids when adjacent to the LC cell. When the field is removed, the particles remain in a stable state defined by the nematic director field (State A). When the magnetic probe is repositioned relative to the LC cell, colloids translated in the opposite direction. When the field is removed, the particles remain in a stable state that is defined by the nematic director field (State B).

The bi-stability of sickle posts (see FIG. 19) also illustrates how combining lock-and-key and defect-sharing phenomena in nematic liquid crystal (NLC) with intentional geometric design enables the realization of a tunable MEP element. Unlike the lock-and-key phenomena which minimizes NLC free energy via the matching of complementary director fields, defect-sharing mechanisms minimize the extent of defect regions in order to reduce NLC free energy. Post MEPs are demonstrated experimentally using sickle-shaped pillars. It is observed that sickle posts are circumscribed with Saturn ring defects that nearly emulate the post's cross-sectional shape. This is consistent with experimental observations in the literature of pillars with circular, triangular, square and pentagon cross-sections which are circumscribed by Saturn defects with shapes matching their respective pillar cross-sections. One can exploit these defects and the director field around the posts here to manipulate and trap colloids. In the absence of an external field, colloids docked spontaneously in the curvature of the posts. In the presence of an external electric field, Ag-silica colloids can be repositioned from one post to another (State A to State B). Thus illustrates the multi-stability and reconfigurability of post-MEP elements.

Simulations and experiments can have analogous NLC cell setups. Surfaces (pores, colloids, and glass lids) can impose strong homeotropic anchoring on nematogens. Geometric features (pores and posts) sit atop the bottom lid; these structures are immersed in NLC such that a layer of NLC exists above them. This layer of NLC creates a gap of fluid between the top-most plane of a geometric feature and the top lid; a gap can be present and useful to fill the system with NLC colloidal suspensions after cell assembly.

In the LdG simulation results presented, the director field generated by nematogens is shown in red, defect structures appear blue, and boundaries are green or grey. LdG simulations are performed on a sub-micron scale while experiments are performed on the micron scale. Each simulation presents a single local energy minimum that can be attained for a sub-micron system. Micron-scale experiments can be distinct from simulations or contain multiple permutations of simulated results within a single system. Characteristic defects, which increase elastic energy, grow with system size (i.e., larger colloids have larger saturn ring defects). Without being bound to any particular theory or embodiment, the higher costs of certain defects in larger systems can skew which equilibrium configurations are preferred at different system sizes. LdG simulation results are used to provide general insights about experimental results.

Figures 21A, 21B, 21C, 21D, 21E, 21F:
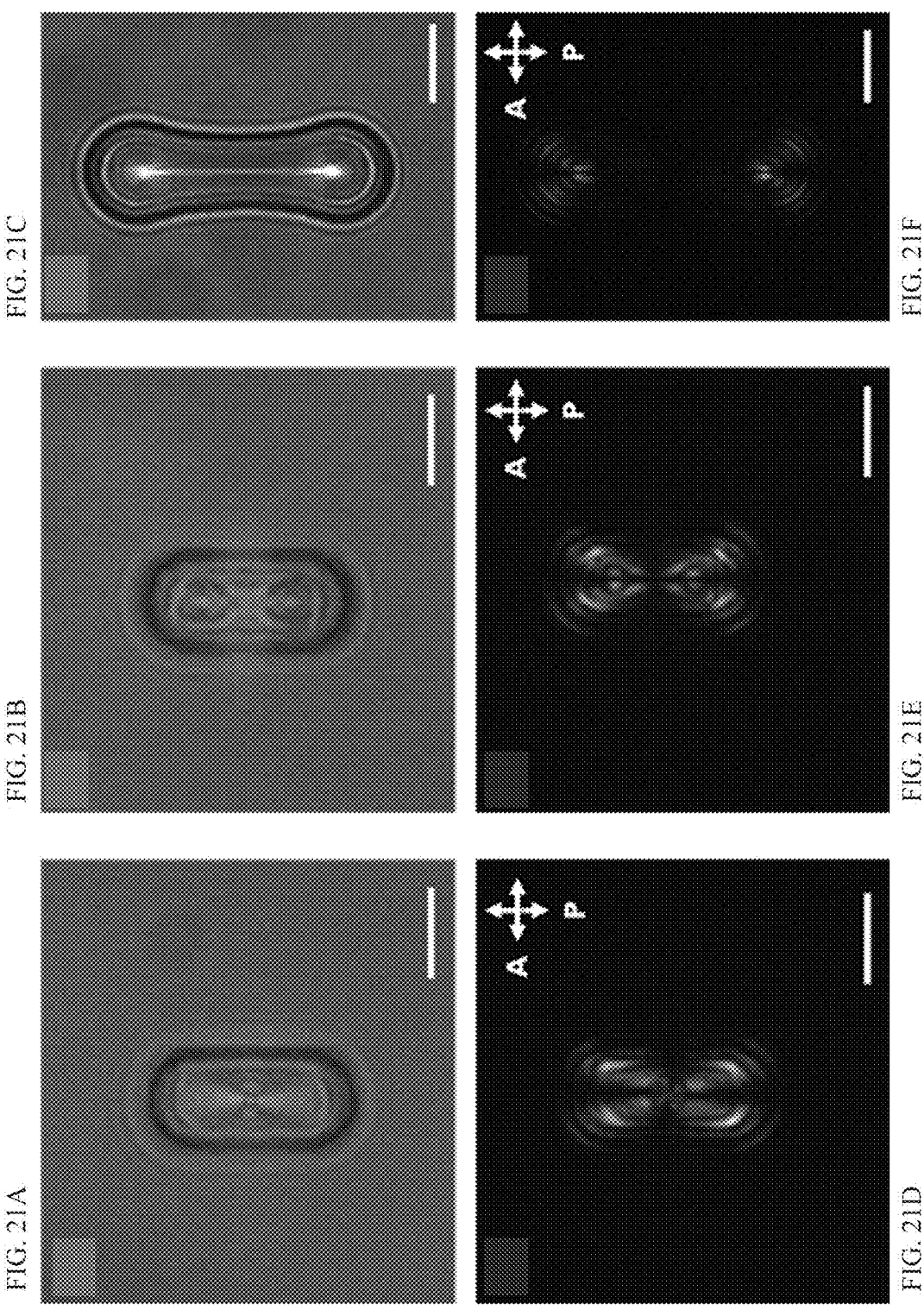

Defects in NLC can be generally be identified as the bright regions in bright field (BF) and cross-polarized (XP) microscopy images. FIG. 21 (FIG. 21A, 21B, 21D, 21E) shows that two distinct defect structures were observed for pillbox pores: one with a single defect core and another featuring two defect cores in each lobe, reminiscent of the simulated system in FIG. 20A. For peanut pores, one unique structure with two defect cores, akin to that in FIG. 20B, was observed. Simulations allow visualization of 3D defect structures; hence, topological charges are assigned to simulated defects in accordance with standard theories in NLC physics.

Aspects

The following Aspects are illustrative only and do not necessarily limit the scope of the present disclosure or the appended claims. Any one or more parts of any Aspect or Aspects can be combined with any one or more parts of any other Aspect or Aspects.

Aspect 1. A reconfigurable multistable metasurface component, comprising:

a substrate, the substrate defining a first confinement volume;

a first element disposed within the first confinement volume;

and the first confinement volume and the first element are configured such that: (a) in the absence of applied energy to the first element, the first element maintains a first mechanically stable state within the first confinement volume or maintains a second mechanically stable state within the first confinement volume; and (b) application of an energy reversibly encourages the first element from one of the first mechanically stable state within the first confinement volume or the second mechanically stable state within the first confinement volume to the other mechanically stable state, wherein a state refers to at least one of a positional state and a rotational state. The first element can be, e.g., a colloidal particle, and a nematic liquid crystal can be disposed in the confinement volume.

Without being bound to any particular theory or embodiment, it can be preferable to place a nematic liquid crystal can be disposed in the confinement volume. Also without being bound to any particular theory, a component can be designed such that the applied energy (which can take the form of an electrical or magnetic field) must exceed a threshold value in order to encourage an element out of a mechanically stable state and to another mechanically stable state.

Also without being bound to any particular theory or embodiment, a confinement volume can be, e.g., pill-shaped (sometimes termed pillbox-shaped) or peanut-shaped; a confinement volume can also be circular in shape. A confinement volume can also include two lobes connected by a connector section; an example of such a confinement volume is provided in FIG. 22 attached hereto. A confinement volume can include a plurality of lobes, e.g., as a two-, three-, or four-lobed confinement volume.

By reference to FIG. 22 and without being bound to any particular theory or embodiment, a pore can have a radius of curvature R, which can be in the range of from about 1.001 to 20 times the radius of curvature of a colloid (for example, a particle) contained within the pore. As an example, a pore can have a radius of curvature R of from about 1.001 to about 10, from about 1.05 to about 5, from about 1.1 to about 2, or even about 1.5 times the radius of curvature of a colloid contained in the pore. The radius of curvature can be in the range of from, or example, 1 to about 100,000 nm or even 1,000,000 nm, from about 10 to about 5,000 nm, from about 50 to about 5000 nm, from about 100 to about 1000 nm, and all intermediate values. For a peanut port with a connector section that connects the lobes, the length C of the connector section can be from 0.05 to about 10 times the radius of curvature of a lobe that is connected to the connector section, for example from about 0.05 to about 10, from about 0.1 to about 8, from about 0.5 to about 5, or even about 2 times the radius of curvature of a lobe that is connected to the connector section. A pore can have an end-to-end distance L (measured from a first apex to an apex across from the first apex) that can be, for example from about 1.5 to about 100 times (or from about 3 to about 50, or from about 5 to about 35, or from about 7 to about 25 times) the radius of curvature R of the pore. As but one example, a pore can have a length C of from about 100 to 10,000,000 nm, or from about 200 to about 1,000,000 nm, or from about 500 to about 500,000 nm, and all intermediate values and sub-ranges.

It should be understood that although the term "multistable" can refer to a bistable system, the term can also refer to systems that include more than two stable states.

A component according to the present disclosure can present a gradient of elements, e.g., elements present at a certain spatial density at one region on the component, and elements present at a different spatial density elsewhere on the component. It should also be understood that a component according to the present disclosure can include one type of element (e.g., a monodisperse population of ellipsoid elements), but a component can also include a plurality of different elements, e.g., a population of spheres and a population of ellipsoids. In this way, a component can be sensitive to different applied energies, e.g., a first energy acts to switch at least some spheres on a component from a first state to a second state while leaving unchanged the state of ellipsoid elements; and a second energy acts to switch at least some of the ellipsoid elements of the component from a first state to a second state while leaving unchanged the state of sphere elements.

Aspect 2. The reconfigurable multistable metasurface component of Aspect 1, wherein the first confinement volume and the first element are configured such that:

(a) in the absence of applied energy, the first element maintains a third mechanically stable state within the first confinement volume, and (b) application of an energy reversibly encourages the first element from the third mechanically stable state to the first mechanically stable state within the first confinement volume or to the second mechanically stable state within the first confinement volume.

Aspect 3. The reconfigurable multistable metasurface component of any one of Aspects 1-2, wherein the first confinement volume defines at least two lobes or at least two apices. As an example (and as described elsewhere herein), a confinement volume can include lobes arranged in a cross pattern; a confinement volume can be pill-shaped and/or peanut-shaped.

Aspect 4. The reconfigurable multistable metasurface component of any one of Aspects 1-3, wherein the first confinement volume is formed in the material of the substrate. Such a volume can be etched or otherwise formed in the surface of the substrate.

Aspect 5. The reconfigurable multistable metasurface component of any one of Aspects 1-4, wherein the first confinement volume is defined within a depression or within one or more walls.

Aspect 6. The reconfigurable multistable metasurface component of any one of Aspects 1-5, wherein the first element defines a circular cross-section. As an example, an element can be a sphere or a disc, although this is not a requirement.

Aspect 7. The reconfigurable multistable metasurface component of any one of Aspects 1-5, wherein the first element defines an elongate cross-section. As an example, an element can be a rod or cylinder, football-shaped, or otherwise shaped.

Aspect 8. The reconfigurable multistable metasurface component of Aspect 7, wherein the first element is characterized as ellipsoidal.

Aspect 9. The reconfigurable multistable metasurface component of any one of Aspects 1-8, further comprising a fixed element positioned such that a spatial relationship between the first element and the fixed element is changed when the first element is at one of the first mechanically stable state within the confinement volume or the second mechanically stable state within the first confinement volume so as to form a dimer between the first element and the fixed element. As described elsewhere herein, the spatial relationship can refer to a distance between the elements, but can also refer to the elements' rotation relative to one another.

An example of the foregoing is illustrated by the change from State 1 and State 2 as shown in FIG. 5A herein, as well as the embodiment shown in FIG. 9 of the present disclosure. As an example (using ellipsoid elements), changing the orientation of an ellipsoidal particle by 90 degree will significantly change the electromagnetic response of the surface. Alternatively, one can change the relative orientation of a dimer from vertically aligned to horizontally aligned.

Aspect 10. The reconfigurable multistable metasurface component of any one of Aspects 1-9, wherein the substrate defines a second confinement volume, and wherein a second element is disposed within the second confinement volume, and wherein the second confinement volume and the second element are configured such that:

(a) in the absence of applied energy to the second element, the second element maintains a first mechanically stable state within the second confinement volume or a second mechanically stable state within the second confinement volume; and (b) application of an energy reversibly encourages the second element from one of the first mechanically stable state within the second confinement volume and the second mechanically stable state to the other mechanically stable state within the second confinement volume.

An example of the foregoing is seen in, e.g., FIG. 10 of the present disclosure, which figure shows multiple confinement volumes and the movement of elements within those confinement volumes. It should also be understood that a component according to the present disclosure can include one or more layers of confinement layers and elements. As an example a device could include a first substrate as shown in FIG. 10, with a second substrate located above (i.e., in a different plane) from the first substrate. In this way, a user can effect different scattering or other properties in different planes.

Aspect 11. The reconfigurable multistable metasurface component of Aspect 10, wherein the first confinement volume defines a major axis, wherein the second confinement volume defines a major axis, and wherein the major axes of the first and second confinement volumes are parallel.

Aspect 12. The reconfigurable multistable metasurface component of Aspect 10, wherein the first confinement volume defines a major axis, wherein the second confinement volume defines a major axis, and where in the major axes of the first and second confinement volumes are non-parallel to one another, the major axes optionally being perpendicular to one another.

Aspect 13. The reconfigurable multistable metasurface component of Aspect 10, wherein the major axes of the first and second confinement volumes do not lie in the same plane.

Aspect 14. The reconfigurable multistable metasurface component of any one of Aspects 1-13, further comprising an energy source configured to apply an energy that reversibly encourages the first element from one of the first mechanically stable state and the second mechanically stable state to the other mechanically stable state within the first confinement volume.

Aspect 15. The reconfigurable multistable metasurface component of Aspect 14, wherein the energy source provides a current, an illumination, an electric field, a magnetic field, a chemical gradient, or any combination thereof.

Aspect 16. The reconfigurable multistable metasurface component of any one of Aspects 1-15, wherein the reconfigurable multistable metasurface component is positioned so as to filter a signal applied to the reconfigurable multistable metasurface component.

Aspect 17. The reconfigurable multistable metasurface component of Aspect 16, wherein the signal is an illumination, an electrical signal, or any combination thereof.

Aspect 18. The reconfigurable multistable metasurface component of Aspect 17, wherein the reconfigurable multistable metasurface component is configured as a polarizer.

Aspect 19. A method, comprising: applying an energy to a reconfigurable multistable metasurface component according to any one of Aspects 1-18 so as to reversibly encourage the first element from one of the first mechanically stable state within the first confinement volume and the second mechanically stable state within the first confinement volume to the other mechanically stable state.

Aspect 20. The method of Aspect 19, wherein the energy is applied is in response to one or more predetermined criteria. Without being bound to any particular configuration, such a method can be applied such that a device is "switched" when a particular criterion is met, e.g., a certain level of illumination striking a window, a certain temperature is present, and the like.

Aspect 21. A reconfigurable multistable metasurface component, comprising:

(a) a set of first confinement volumes and a set of first elements disposed within the set of first confinement volumes, the set of first confinement volumes and the set of first elements being configured such that (a1) in the absence of applied energy to the set of first elements, the first elements maintain first mechanically stable states within their respective first confinement volumes or maintain second mechanically stable states within their respective first confinement volumes; and (a2) application of an energy reversibly encourages the set of first elements from their first mechanically stable states or their second mechanically stable states to the other mechanically stable state;

(b) a plurality of fixed elements;

(c) a set of second confinement volumes and a set of second elements disposed within the set of second confinement volumes, the set of second confinement volumes and the set of second elements being configured such that (c1) in the absence of applied energy to the set of second elements, the second elements maintain first mechanically stable states within their respective second confinement volumes or maintain second mechanically stable states within their respective second confinement volumes; and (c2) application of an energy reversibly encourages the set of second elements from the second mechanically stable states or the second mechanically stable states to the other mechanically stable state; or (d) both (b) and (c).

Without being bound to any theory or configuration, the foregoing is illustrated by a multipixel arrangement in which there is a first set of moveable elements with one or both of a second set of moveable elements and a set of fixed elements. Such an embodiment is shown in, e.g., FIG. 5.

Aspect 22. The reconfigurable multistable metasurface component of Aspect 21, comprising a plurality of fixed elements wherein the fixed elements are positioned such that a spatial relationship between a first element and a fixed element is changed when the first element is at one of the first mechanically stable state within the confinement volume or the second mechanically stable state within the first confinement volume so as to give rise to a plurality of dimers, each dimer comprising a first element and a fixed element.

Without being bound to any particular theory or configuration, the foregoing is illustrated by the dimer that arises with the movement of an element from State 1 and State 2 as shown in FIG. 5A of the present disclosure, as well as the wall-less embodiment shown in FIG. 9 of the disclosure.

Aspect 23. The reconfigurable multistable metasurface component of Aspect 21, comprising a plurality of fixed elements wherein the fixed elements are positioned such that when a first element is at one of the first mechanically stable state within the confinement volume or the second mechanically stable state within the first confinement volume, the first element is placed into register with one or more other first elements and one or more fixed elements so as to define a chain whereby a line drawn along the chain intersects (i) at least two first elements and at least one fixed element, or (ii) at least one first element and at least two fixed elements.

Without being bound to any particular theory or configuration, the foregoing is illustrated by the movement of an element from State 1 and State 2 as shown in FIG. 6A of the project description.

Aspect 24. The reconfigurable multistable metasurface component of any one of Aspects 21-23, comprising a set of second confinement volumes and a set of second elements disposed within the set of second confinement volumes, the set of second confinement volumes and the set of second elements being configured such that:

(a) in the absence of applied energy to the set of second elements, the second elements maintain first mechanically stable states within their respective second confinement volumes or maintain second mechanically stable states within their respective second confinement volumes; and (b) application of an energy reversibly encourages the set of second elements from the second mechanically stable states or the second mechanically stable states to the other mechanically stable state.

Aspect 25. The reconfigurable multistable metasurface component of Aspect 24, wherein the first elements and the second elements are positioned such that a spatial relationship between a first element and a second element is changed when the first element is at one of its first mechanically stable state within the confinement volume or its second mechanically stable state within the second confinement volume so as to give rise to a plurality of dimers, each dimer comprising a first element and a second element. As an example, the foregoing Aspect addresses formation of dimers (or other multimers) from alignment of first moveable elements and second moveable elements Aspect 26. The reconfigurable multistable metasurface component of Aspect 24, wherein the first elements and the second elements are positioned such that when a first element is at one of the first mechanically stable state within the confinement volume or the second mechanically stable state within the first confinement volume, the first element is placed into register with one or more other first elements and one or more fixed elements or one or more second elements so as to define a chain whereby a line drawn along the chain intersects (i) at least one first element and two second elements, or (ii) at least two first elements and one second element. As an example, the foregoing Aspect addresses the formation of chains (or other multimers) from alignment of first moveable elements and second moveable elements.

Aspect 27. The reconfigurable multistable metasurface component of Aspect 21, comprising a plurality of fixed elements and comprising a set of second confinement volumes and a set of second elements disposed within the set of second confinement volumes, the set of second confinement volumes and the set of second elements being configured such that:

(a) in the absence of applied energy to the set of second elements, the second elements maintain first mechanically stable states within their respective second confinement volumes or maintain second mechanically stable states within their respective second confinement volumes; and (b) application of an energy reversibly encourages the set of second elements from the second mechanically stable states or the second mechanically stable states to the other mechanically stable state, and wherein the fixed elements are positioned such that a spatial relationship between a first element and a fixed element is changed when the first element is at one of its first mechanically stable state within its confinement volume or its second mechanically stable state within its confinement volume so as to give rise to a plurality of dimers, each dimer comprising a first element and a fixed element, or wherein the fixed elements are positioned such that a spatial relationship between a second element and a fixed element is changed when the second element is at one of its first mechanically stable state within its confinement volume or its second mechanically stable state within its confinement volume so as to give rise to a plurality of dimers, each dimer comprising a second element and a fixed element. The foregoing Aspect addresses formation of dimers (or other multimers) made from fixed elements and either first elements or second elements.

Aspect 28. A method, comprising: applying an energy to a reconfigurable multistable metasurface component according to any one of Aspects 21-27 so as to reversibly encourage a first element from one of the first mechanically stable state and the second mechanically stable state to the other mechanically stable state.

Aspect 29. A reconfigurable multistable metasurface component, comprising: a substrate, the substrate defining a first confinement volume; a first element disposed within the first confinement volume; and the first confinement volume and the first element being configured such that (a) an applied energy to the first element reversibly encourages the first element from one of a plurality of mechanically stable states within the first confinement volume to another of the plurality of mechanically stable states within the first element, and (b) the first element maintains any of the plurality of mechanically stable states in the absence of applied energy.

Aspect 30. The reconfigurable multistable metasurface component of Aspect 29, wherein the substrate lies in a plane and wherein at least one of the plurality of mechanically stable states lies apart from the plane.

Aspect 31. A reconfigurable multistable metasurface component, comprising: a first plurality of elements disposed within a first confinement volume so as to form a first multimer that comprises the plurality of elements in register with one another; a second plurality of elements disposed within a second confinement volume so as to form a second multimer that comprises the second plurality of elements in register with one another; and the first confinement volume and the first element are configured such that:

(a) in the absence of applied energy to the first plurality of elements, the first plurality of elements maintains the first multimer in a first mechanically stable state within the first confinement volume; and (b) application of an energy reversibly encourages at least one of the first plurality of elements within the first confinement volume so as to remove that at least one element from the first multimer, wherein a state refers to at least one of a positional state and a rotational state. Thus—and without being bound to any particular theory or embodiment, application of a sufficient applied energy can encourage an element out of a multimer or into a multimer.

Aspect 32. A reconfigurable multistable metasurface component, comprising:

a plurality of protrusions extending from a surface, each protrusion having a first concavity facing a first direction and having a second concavity facing a second direction, and the plurality of protrusions optionally being periodically arranged;

a plurality of fixed pillar resonators extending from the surface, the plurality of fixed pillar resonators optionally being periodically arranged; and a plurality of moveable elements, the plurality of moveable elements configured such that the application of an external field reversibly converts the component from one of a first mechanically stable state and a second mechanically stable state to the other of the first mechanically stable state and the second mechanically stable state, wherein (a) in the first mechanically stable state, each of the plurality of moveable elements associates with the first concavity of a first protrusion such that a periodic lattice is defined by the resonators and the moveable elements; and (b) in the second mechanically stable state, each of the plurality of moveable elements associates with the second concavity of a second protrusion so as to define a multimer comprising protrusions and moveable elements in register with one another, wherein a state refers to at least one of a positional state and a rotational state.

Aspect 33. The component of Aspect 32, wherein a fixed pillar resonator defines a circular cross-section.

Aspect 34. The component of any one of Aspects 32-33, wherein the first concavity of a protrusion and the second concavity of the protrusion are configured to conform to a shape of a moveable element.

Aspect 35. The component of any one of Aspects 32-34, wherein a protrusion defines a sickle profile.

Aspect 36 The component of any one of Aspects 32-34, wherein a protrusion defines an hourglass profile.

Aspect 37. The component of Aspect 32, wherein the protrusion defines a maximum cross-sectional dimension, wherein the moveable element defines a maximum cross-sectional dimension, and wherein the maximum cross-sectional dimension of the protrusion is greater than the maximum cross-sectional dimension of the moveable element.

Aspect 38. The component of Aspect 32, wherein the protrusion defines a maximum cross-sectional dimension, wherein the moveable element defines a maximum cross-sectional dimension, and wherein the maximum cross-sectional dimension of the protrusion is less than the maximum cross-sectional dimension of the moveable element.

Aspect 39. The component of Aspect 32, wherein the first concavity of the protrusion is centered along a major axis of the protrusion.

Aspect 40. The component of Aspect 34, wherein the first concavity of the protrusion is not centered along a major axis of the protrusion.

Aspect 41. A method, comprising applying an external field to a component according to any one of Aspects 32-40 so as to convert the component from one of the first mechanically stable state and the second mechanically stable state to the other of the first mechanically stable state and the second mechanically stable state.

Aspect 42. A reconfigurable multistable metasurface component, comprising:

a plurality of protrusions extending from a surface, each protrusion comprising a first concavity along a first direction, a second concavity opening along a second direction that is perpendicular to the first direction, a third concavity opposite the first concavity and opening along the first direction, and a fourth concavity opposite the second concavity and opening along the second direction, and the plurality of protrusions being periodically arranged; and at least one moveable resonator, the at least one moveable resonator defining a major axis and a first end and a second end lying along the major axis, the at least one moveable resonator being positioned such that the application of an external field reversibly converts the component from one of a first mechanically stable state and a second mechanically stable state to the other of the first mechanically stable state and the second mechanically stable state, wherein (a) in the first mechanically stable state, the major axis of the moveable resonator lies along the first direction and the first end of the moveable resonator is associated with the third concavity of a first protrusion and the second end of the moveable resonator is associated with the first concavity of a third protrusion, and (b) in the second mechanically stable state, the major axis of the moveable resonator lies along the second direction and the first end of the moveable resonator is associated with the fourth concavity of a second protrusion and the second end of the moveable resonator is associated with the second concavity of a fourth protrusion, wherein a state refers to at least one of a positional state and a rotational state.

Aspect 43. The component of Aspect 42, comprising a plurality of moveable resonators.

Aspect 44. The component of Aspect 42, wherein a moveable resonator is an elliptical colloidal particle.

Aspect 45. A method, comprising applying an external field to a component according to any one of Aspects 41-44 so as to convert the component from one of the first mechanically stable state and the second mechanically stable state to the other of the first mechanically stable state and the second mechanically stable state.

Example Applications

Without limitation, the disclosed technology can be used in polarizer applications, filters, imaging, and other applications in which the component interacts with or even directs a signal.

REFERENCES

The following references are provided for convenience only; their inclusion is not an acknowledgment that they are in any way material to the patentability of the technology disclosed herein.

[1] Tatarkova, S. A., D. R. Burnham, A. K. Kirby, G. D. Love, and E. M. Terentjev. "Colloidal interactions and transport in nematic liquid crystals." *Physical review letters* 98, no. 15 (2007): 157801.

[2] Lavrentovich, Oleg D., Israel Lazo, and Oleg P. Pishnyak. "Nonlinear electrophoresis of dielectric and metal spheres in a nematic liquid crystal." *Nature* 467, no. 7318 (2010): 947-950.

[3] Lavrentovich, Oleg D. "Transport of particles in liquid crystals." *Soft Matter* 10, no. 9 (2014): 1264-1283.

[4] Cal, Wenshan, and Vladimir M. Shalaev. *Optical metamaterials*. Vol. 10, no. 6011. New York: Springer, 2010.

[5] Urbas, Augustine M., Zubin Jacob, Luca Dal Negro, Nader Engheta, A. D. Boardman, P. Egan, Alexander B. Khanikaev et al. "Roadmap on optical metamaterials." *Journal of Optics* 18, no. 9 (2016): 093005.

[6] Cummer, Steven A., Johan Christensen, and Andrea Alb. "Controlling sound with acoustic metamaterials." *Nature Reviews Materials* 1, no. 3 (2016): 16001.

[7] Sklan, Sophia R., and Baowen Li. "Thermal metamaterials: functions and prospects." *National Science Review* 5, no. 2 (2018): 138-141.

[8] Balanis, Constantine A. *Advanced engineering electromagnetics*. John Wiley & Sons, 1999.

[9] Valentine, Jason, Shuang Zhang, Thomas Zentgraf, Erick Ulin-Avila, Dentcho A. Genov, Guy Bartal, and Xiang Zhang. "Three-dimensional optical metamaterial with a negative refractive index." *Nature* 455, no. 7211 (2008): 376-379.

[10] Fang, Nicholas, Hyesog Lee, Cheng Sun, and Xiang Zhang. "Sub-diffraction-limited optical imaging with a silver superlens." *Science* 308, no. 5721 (2005): 534-537.

[11] Sun, Shulin, Kuang-Yu Yang, Chih-Ming Wang, Ta-Ko Juan, Wei Ting Chen, Chun Yen Liao, Qiong He et al. "High-efficiency broadband anomalous reflection by gradient meta-surfaces." *Nano letters* 12, no. 12 (2012): 6223-6229.

[12] Yu, Nanfang, and Federico Capasso. "Flat optics with designer metasurfaces." *Nature materials* 13, no. 2 (2014): 139-150.

[13] Grady, Nathaniel K., Jane E. Heyes, Dibakar Roy Chowdhury, Yong Zeng, Matthew T. Reiten, Abul K. Azad, Antoinette J. Taylor, Diego A R Dalvit, and Hou-Tong Chen. "Terahertz metamaterials for linear polarization conversion and anomalous refraction." *Science* 340, no. 6138 (2013): 1304-1307.

[14] Watts, Claire M., Xianliang Liu, and Willie J. Padilla. "Metamaterial electromagnetic wave absorbers." *Advanced materials* 24, no. 23 (2012): OP98-OP120.

[15] Yu, Nanfang, Patrice Genevet, Mikhail A. Kats, Francesco Aieta, Jean-Philippe Tetienne, Federico Capasso, and Zeno Gaburro. "Light propagation with phase discontinuities: generalized laws of reflection and refraction." *Science* 334, no. 6054 (2011): 333-337.

[16] Moitra, Parikshit, Brian A. Slovick, Wei Li, Ivan I. Kravchencko, Dayrl P. Briggs, S. Krishnamurthy, and Jason Valentine. "Large-scale all-dielectric metamaterial perfect reflectors." *ACS Photonics* 2, no. 6 (2015): 692-698.

[17] Yu, Ye Feng, Alexander Y. Zhu, Ramon Paniagua-Dominguez, Yuan Hsing Fu, Boris Luk'yanchuk, and Arseniy I. Kuznetsov. "High-transmission dielectric metasurface with 2π phase control at visible wavelengths." *Laser & Photonics Reviews* 9, no. 4 (2015): 412-418.

[18] Liu, Na, Martin Mesch, Thomas Weiss, Mario Hentschel, and Harald Giessen. "Infrared perfect absorber and its application as plasmonic sensor." *Nano letters* 10, no. 7 (2010): 2342-2348.

[19] Watts, Claire M., David Shrekenhamer, John Montoya, Guy Lipworth, John Hunt, Timothy Sleasman, Sanjay Krishna, David R. Smith, and Willie J. Padilla. "Terahertz compressive imaging with metamaterial spatial light modulators." *Nature Photonics* 8, no. 8 (2014): 605.

[20] Ni, Xingjie, Alexander V. Kildishev, and Vladimir M. Shalaev. "Metasurface holograms for visible light." *Nature communications* 4, no. 1 (2013): 1-6.

[21] Zheng, Guoxing, Holger Malenbernd, Mitchell Kenney, Guixin Li, Thomas Zentgraf, and Shuang Zheng. "Metasurface holograms reaching 80% efficiency." *Nature nanotechnology* 10, no. 4 (2015): 308-312.

[22] Raman, Aaswath P., Marc Abou Anoma, Linxiao Zhu, Eden Rephaeli, and Shanhui Fan. "Passive radiative cooling below ambient air temperature under direct sunlight." *Nature* 515, no. 7528 (2014): 540-544.

[23] Lee, Sz-Yuan, Hsi-Wen Tung, Wen-Chih Chen, and Weileun Fang. "Thermal actuated solid tunable lens." *IEEE Photonics Technology Letters* 18, no. 21 (2006): 2191-2193.

[24] Kamali, Seyedeh Mahsa, Ehsan Arbabi, Amir Arbabi, Yu Horie, and Andrei Faraon. "Highly tunable elastic dielectric metasurface lenses." *Laser & Photonics Reviews* 10, no. 6 (2016): 1002-1008.

[25] Ee, Ho-Seok, and Ritesh Agarwal. "Tunable metasurface and flat optical zoom lens on a stretchable substrate." *Nano letters* 16, no. 4 (2016): 2818-2823.

[26] Ou, Jun-Yu, Eric Plum, Jianfa Zhang, and Nikolay I. Zheludev. "An electromechanically reconfigurable plasmonic metamaterial operating in the near-infrared." *Nature nanotechnology* 8, no. 4 (2013): 252-255.

[27] Arbabi, Ehsan, Amir Arbabi, Seyedeh Mahsa Kamali, Yu Horie, MohammadSadegh Faraji-Dana, and Andrei Faraon. "MEMS-tunable dielectric metasurface lens." *Nature communications* 9, no. 1 (2018): 1-9.

[28] Soref, Richard, and J. Larenzo. "All-silicon active and passive guided-wave components for λ=1.3 and 1.6 μm." *IEEE Journal of Quantum Electronics* 22, no. 6 (1986): 873-879.

[29] Soref, Richard and A., and Brian R. Bennett. "Electrooptical effects in silicon." *IEEE journal of quantum electronics* 23, no. 1 (1987): 123-129.

[30] Feigenbaum, Eyal, Kenneth Diest, and Harry A. Atwater. "Unity-order index change in transparent conducting oxides at visible frequencies." *Nano letters* 10, no. 6 (2010): 2111-2116.

[31] Wang, Qian, Edward T F Rogers, Behrad Gholipour, Chih-Ming Wang, Guanghui Yuan, Jinghua Teng, and Nikolay I. Zheludev. "Optically reconfigurable metasurfaces and photonic devices based on phase change materials." *Nature Photonics* 10, no. 1 (2016): 60.

[32] Makarov, Sergey V., Anastasia S. Zalogina, Mohammad Tajik, Dmitry A. Zuev, Mikhail V. Rybin, Aleksandr A. Kuchmizhak, Saulius Juodkazis, and Yuri Kivshar. "Light-Induced Tuning and Reconfiguration of Nanophotonic Structures." *Laser & Photonics Reviews* 11, no. 5 (2017): 1700108.

[33] Li, Guixin, Shuang Zhang, and Thomas Zentgraf. "Nonlinear photonic metasurfaces." *Nature Reviews Materials* 2.5 (2017): 1-14.

[34] Zhang, Jianfa, Kevin F. MacDonald, and Nikolay I. Zheludev. "Controlling light-with-light without nonlinearity." *Light: Science & Applications* 1.7 (2012): e18-e18.

[35] Ren, Mengxin, Baohua Jia, Jun-Yu Ou, Eric Plum, Jianfa Zhang, Kevin F. MacDonald, Andrey E. Nikolaenko, Jingjun Xu, Min Gu, and Nikolay I. Zheludev. "Nanostructured plasmonic medium for terahertz bandwidth all-optical switching." *Advanced Materials* 23, no. 46 (2011): 5540-5544.

[36] Papaioannou, Maria, Eric Plum, Joao Valente, Edward T F Rogers, and Nikolay I. Zheludev. "Two-dimensional control of light with light on metasurfaces." *Light: Science & Applications* 5, no. 4 (2016): e16070-e16070.

[37] De Gennes, Pierre-Gilles, and Jacques Prost. *The physics of liquid crystals.* Vol. 83. Oxford university press, 1993.

[38] Buchnev, O., J. Y. Ou, M. Kaczmarek, N. I. Zheludev, and V. A. Fedotov. "Electro-optical control in a plasmonic metamaterial hybridised with a liquid-crystal cell." *Optics express* 21, no. 2 (2013): 1633-1638.

[39] Decker, Manuel, Christian Kremers, Alexander Minovich, Isabelle Staude, Andrey E. Miroshnichenko, Dmitry Chigrin, Dragomir N. Neshev, Chennupati Jagadish, and Yuri S. Kivshar. "Electro-optical switching by liquid-crystal controlled metasurfaces." *Optics express* 21, no. 7 (2013): 8879-8885.

[40] Komar, Andrei, Zheng Fang, Justus Bohn, Jürgen Sautter, Manuel Decker, Andrey Miroshnichenko, Thomas Pertsch et al. "Electrically tunable all-dielectric optical metasurfaces based on liquid crystals." *Applied Physics Letters* 110, no. 7 (2017): 071109.

[41] Sautter, Jurgen, Isabelle Staude, Manuel Decker, Evgenia Rusak, Dragomir N. Neshev, Igal Brener, and Yuri S. Kivshar. "Active tuning of all-dielectric metasurfaces." *ACS nano* 9, no. 4 (2015): 4308-4315.

[42] Parry, Matthew, Andrei Komar, Ben Hopkins, Salvatore Campione, Sheng Liu, Andrey E. Miroshnichenko, John Nogan, Michael B. Sinclair, Igal Brener, and Dragomir N. Neshev. "Active tuning of high-Q dielectric metasurfaces." *Applied Physics Letters* 111, no. 5 (2017): 053102.

[43] Komar, Andrei, Ramon Paniagua-Dominguez, Andrey Miroshnichenko, Ye Feng Yu, Yuri S. Kivshar, Arseniy I. Kuznetsov, and Dragomir Neshev. "Dynamic beam switching by liquid crystal tunable dielectric metasurfaces." *ACS Photonics* 5, no. 5 (2018): 1742-1748.

[44] Luo, Yimin, Francesca Serra, and Kathleen J. Stebe. "Experimental realization of the "lock-and-key" mechanism in liquid crystals." *Soft Matter* 12.28 (2016): 6027-6032.

[45] Luo, Yimin, Daniel A. Beller, Giuseppe Boniello, Francesca Serra, and Kathleen J. Stebe. "Tunable colloid trajectories in nematic liquid crystals near wavy walls." *Nature communications* 9, no. 1 (2018): 1-11.

[46] Luo, Yimin, Tianyi Yao, Daniel A. Beller, Francesca Serra, and Kathleen J. Stebe. "Deck the walls with anisotropic colloids in nematic liquid crystals." *Langmuir* 35, no. 28 (2019): 9274-9285.

[47] Liu, Zhengqi, Guiqiang Liu, Yan Wang, Xiaoshan Liu, Shan Huang, Pingping Pan, Chengwu Zou, and Guolan Fu. "Polarization-Induced Tunability of Plasmonic Light Absorption in Arrays of Sub-Wavelength Elliptical Disks." *Plasmonics* 11, no. 1 (2016): 79-86.

[48] Najiminaini, Mohamadreza, Bozena Kaminska, Keith St Lawrence, and Jeffrey J L Carson. "Bolus tracking with nanofilter-based multispectral videography for capturing microvasculature hemodynamics." *Scientific reports* 4, no. 1 (2014): 1-9.

[49] Zeng, Beibei, Yongkang Gao, and Filbert J. Bartoli. "Ultrathin nanostructured metals for highly transmissive plasmonic subtractive color filters." *Scientific reports* 3 (2013): 2840.

[50] Chen, Jing, Rongqing Xu, Peng Mao, Yuting Zhang, Yuanjian Liu, Chaojun Tang, Jianqiang Liu, and Tao Chen. "Realization of Fanolike resonance due to diffraction coupling of localized surface plasmon resonances in embedded nanoantenna arrays." *Plasmonics* 10, no. 2 (2015): 341-346.

[51] Knight, Mark W., Heidar Sobhani, Peter Nordlander, and Naomi J. Halas. "Photodetection with active optical antennas." *Science* 332, no. 6030 (2011): 702-704.

[52] Liu, Zhengqi, Guiqiang Liu, Shan Huang, Xiaoshan Liu, Pingping Pan, Yan Wang, and Gang Gu. "Multispectral spatial and frequency selective sensing with ultra-compact cross-shaped antenna plasmonic crystals." *Sensors and Actuators B: Chemical* 215 (2015): 480-488.

[53] Ni, Songbo, Jessica Leemann, Ivo Buttinoni, Lucio Isa, and Heiko Wolf. "Programmable colloidal molecules from sequential capillarity-assisted particle assembly." *Science advances* 2, no. 4 (2016): e1501779.

[54] Li, Jun, Shin-Tson Wu, Stefano Brugioni, Riccardo Meucci, and Sandro Faetti. "Infrared refractive indices of liquid crystals." *Journal of Applied Physics* 97, no. 7 (2005): 073501.

[55] Ghanadzadeh-Gilani, Ali. Dielectric and electro-optical properties of some cyanobiphenyl liquid-crystals. *Diss. University of Aston in Birmingham,* 1995.

[56] Pratibha, R., K. Park, I. I. Smalyukh, and W. Park. "Tunable optical metamaterial based on liquid crystal-gold nanosphere composite." *Optics express* 17, no. 22 (2009): 19459-19469.

[57] Greybush, Nicholas J., Ingo Liberal, Ludivine Malassis, James M. Kikkawa, Nader Engheta, Christopher B. Murray, and Cherie R. Kagan. "Plasmon resonances in self-assembled two-dimensional Au nanocrystal metamolecules." *ACS nano* 11, no. 3 (2017): 2917-2927.

[58] Estakhri, Nasim Mohammadi, and Andrea Alù. "Recent progress in gradient metasurfaces." *JOSA B* 33.2 (2016): A21-A30.

[59] Molesky, Sean, Zin Lin, Alexander Y. Piggott, Weiliang Jin, Jelena Vucković, and Alejandro W. Rodriguez. "Inverse design in nanophotonics." *Nature Photonics* 12, no. 11 (2018): 659-670.

[60] Sussman, Daniel M., and Daniel A. Beller. "Fast, scalable, and interactive software for Landau-de Gennes numerical modeling of nematic topological defects." *Frontiers in Physics* 7 (2019): 204.

[61] Honglawan, Apiradee, Daniel A. Beller, Marcello Cavallaro, Randall D. Kamien, Kathleen J. Stebe, and Shu Yang. "Pillar-Assisted Epitaxial Assembly of Tonic Focal Conic Domains of Smectic-A Liquid Crystals." *Advanced Materials* 23, no. 46 (2011): 5519-5523.

[62] Honglawan, Apiradee, Daniel A. Beller, Marcello Cavallaro, Randall D. Kamien, Kathleen J. Stebe, and Shu Yang. "Topographically induced hierarchical assembly and geometrical transformation of focal conic domain arrays in smectic liquid crystals." *Proceedings of the National Academy of Sciences* 110, no. 1 (2013): 34-39.

[63] Gharbi, Mohamed Amine, Marcello Cavallaro Jr, Gaoxiang Wu, Daniel A. Beller, Randall D. Kamien, Shu Yang, and Kathleen J. Stebe. "Microbullet assembly: Interactions of oriented dipoles in confined nematic liquid crystal." *Liquid Crystals* 40, no. 12 (2013): 1619-1627.

[64] Cavallaro Jr, Marcello, Mohamed A. Gharbi, Daniel A. Beller, Simon Čopar, Zheng Shi, Randall D. Kamien, Shu Yang, Tobias Baumgart, and Kathleen J. Stebe. "Ring around the colloid." *Soft Matter* 9, no. 38 (2013): 9099-9102.

[65] Cavallaro, Marcello, Mohamed A. Gharbi, Daniel A. Beller, Simon Čopar, Zheng Shi, Tobias Baumgart, Shu Yang, Randall D. Kamien, and Kathleen J. Stebe. "Exploiting imperfections in the bulk to direct assembly of surface colloids." *Proceedings of the National Academy of Sciences* 110, no. 47 (2013): 18804-18808.

[66] Beller, Daniel A., Mohamed A. Gharbi, Apiradee Honglawan, Kathleen J. Stebe, Shu Yang, and Randall D. Kamien. "Focal conic flower textures at curved interfaces." *Physical Review* X 3, no. 4 (2013): 041026.

[67] Lohr, Matthew A., Marcello Cavallaro, Daniel A. Beller, Kathleen J. Stebe, Randall D. Kamien, Peter J. Collings, and Arjun G. Yodh. "Elasticity-dependent selfassembly of micro-templated chromonic liquid crystal films." *Soft Matter* 10, no. 19 (2014): 3477-3484.

[68] Honglawan, Apiradee, Dae Seok Kim, Daniel A. Beller, Dong Ki Yoon, Mohamed A. Gharbi, Kathleen J. Stebe, Randall D. Kamien, and Shu Yang. "Synergistic assembly of nanoparticles in smectic liquid crystals." *Soft Matter* 11, no. 37 (2015): 7367-7375.

[69] Tran, Lisa, Maxim O. Lavrentovich, Daniel A. Beller, Ningwei Li, Kathleen J. Stebe, and Randall D. Kamien. "Lassoing saddle splay and the geometrical control of topological defects." *Proceedings of the National Academy of Sciences* 113, no. 26 (2016): 7106-7111.

[70] Gharbi, Mohamed Amine, Daniel A. Beller, Nima Sharifi-Mood, Rohini Gupta, Randall D. Kamien, Shu Yang, and Kathleen J. Stebe. "Elastocapillary driven assembly of particles at free-standing smectic-A films." *Langmuir* 34, no. 5 (2018): 2006-2013.

[71] Boniello, Giuseppe, Yimin Luo, Daniel A. Beller, Francesca Serra, and Kathleen J. Stebe. "Colloids in confined liquid crystals: a plot twist in the lock-and-key mechanism." *Soft matter* 15, no. 26 (2019): 5220-5226.

[72] Ravnik, Miha, and Slobodan Žumer. "Landau-de Gennes modelling of nematic liquid crystal colloids." *Liquid Crystals* 36.10-11 (2009): 1201-1214.

What is claimed:

1. A reconfigurable multistable metasurface component, comprising:

a substrate, the substrate defining a first confinement volume;

the first confinement volume containing therein a single first element; and the first confinement volume and the first element are configured such that:

(a) in the absence of applied energy to the first element, the first element maintains a first mechanically stable state within the first confinement volume or maintains a second mechanically stable state within the first confinement volume; and (b) application of an energy reversibly encourages the first element from one of the first mechanically stable state within the first confinement volume or the second mechanically stable state within the first confinement volume to the other mechanically stable state, wherein a state refers to at least one of a positional state and a rotational state.

2. The reconfigurable multistable metasurface component of claim 1, wherein the first confinement volume and the first element are configured such that:

(a) in the absence of applied energy, the first element maintains a third mechanically stable state within the first confinement volume, and (b) application of an energy reversibly encourages the first element from the third mechanically stable state to the first mechanically stable state within the first confinement volume or to the second mechanically stable state within the first confinement volume.

3. The reconfigurable multistable metasurface component of claim 1, wherein the first confinement volume defines at least two lobes or at least two apices.

4. The reconfigurable multistable metasurface component of claim 1, wherein the first element defines a circular cross-section, an elongate cross-section, or is characterized as ellipsoidal.

5. The reconfigurable multistable metasurface component of claim 1, further comprising a fixed element positioned such that a spatial relationship between the first element and the fixed element is changed when the first element is at one of the first mechanically stable state within the confinement volume or the second mechanically stable state within the first confinement volume so as to form a dimer between the first element and the fixed element.

6. The reconfigurable multistable metasurface component of claim 1, wherein the substrate defines a second confinement volume, and wherein a second element is disposed within the second confinement volume, and wherein the second confinement volume and the second element are configured such that:

(a) in the absence of applied energy to the second element, the second element maintains a first mechanically stable state within the second confinement volume or a second mechanically stable state within the second confinement volume; and (b) application of an energy reversibly encourages the second element from one of the first mechanically stable state within the second confinement volume and the second mechanically stable state to the other mechanically stable state within the second confinement volume.

7. The reconfigurable multistable metasurface component of claim 6, wherein the first confinement volume defines a major axis, wherein the second confinement volume defines a major axis, and wherein the major axes of the first and second confinement volumes are parallel.

8. The reconfigurable multistable metasurface component of claim 1, further comprising an energy source configured to apply an energy that reversibly encourages the first element from one of the first mechanically stable state and the second mechanically stable state to the other mechanically stable state within the first confinement volume.

9. The reconfigurable multistable metasurface component of claim 1, wherein the reconfigurable multistable metasurface component is positioned so as to filter a signal applied to the reconfigurable multistable metasurface component.

10. A reconfigurable multistable metasurface component, comprising:

(a) a set of first confinement volumes and a set of first elements disposed within the set of first confinement volumes, each first confinement volume containing a single first element, the set of first confinement volumes and the set of first elements being configured such that:

(1) in the absence of applied energy to the set of first elements, the first elements maintain first mechanically stable states within their respective first confinement volumes or maintain second mechanically stable states within their respective first confinement volumes; and (2) application of an energy reversibly encourages the set of first elements from their first mechanically stable states or their second mechanically stable states to the other mechanically stable state; and at least one of (b1) a plurality of fixed elements; and (b2) a set of second confinement volumes and a set of second elements disposed within the set of second confinement volumes, the set of second confinement volumes and the set of second elements being configured such that (1) in the absence of applied energy to the set of second elements, the second elements maintain first mechanically stable states within their respective second confinement volumes or maintain second mechanically stable states within their respective second confinement volumes, and (2) application of an energy reversibly encourages the set of second elements from the second mechanically stable states or the second mechanically stable states to the other mechanically stable state.

11. The reconfigurable multistable metasurface component of claim 10, comprising a plurality of fixed elements wherein the fixed elements are positioned such that a spatial relationship between a first element and a fixed element is changed when the first element is at one of the first mechanically stable state within the confinement volume or the second mechanically stable state within the first confinement volume so as to give rise to a plurality of dimers, each dimer comprising a first element and a fixed element.

12. The reconfigurable multistable metasurface component of claim 10, comprising a plurality of fixed elements wherein the fixed elements are positioned such that when a first element is at one of the first mechanically stable state within the confinement volume or the second mechanically stable state within the first confinement volume, the first element is placed into register with one or more other first elements and one or more fixed elements so as to define a chain whereby a line drawn along the chain intersects (i) at least two first elements and at least one fixed element or (ii) at least one first element and at least two fixed elements.

13. The reconfigurable multistable metasurface component of claim 10, comprising a set of second confinement volumes and a set of second elements disposed within the set of second confinement volumes, the set of second confinement volumes and the set of second elements being configured such that (a) in the absence of applied energy to the set of second elements, the second elements maintain first mechanically stable states within their respective second confinement volumes or maintain second mechanically stable states within their respective second confinement volumes; and (b) application of an energy reversibly encourages the set of second elements from the second mechanically stable states or the second mechanically stable states to the other mechanically stable state.

14. The reconfigurable multistable metasurface component of claim 13, wherein the first elements and the second elements are positioned such that a spatial relationship between a first element and a second element is changed when the first element is at one of its first mechanically stable state within the confinement volume or its second mechanically stable state within the second confinement volume so as to give rise to a plurality of dimers, each dimer comprising a first element and a second element.

15. The reconfigurable multistable metasurface component of claim 13, wherein the first elements and the second elements are positioned such that when a first element is at one of the first mechanically stable state within the confinement volume or the second mechanically stable state within the first confinement volume, the first element is placed into register with one or more other first elements and one or more fixed elements or one or more second elements so as to define a chain whereby a line drawn along the chain intersects (i) at least one first element and two second elements, or (ii) at least two first elements and one second element.

16. The reconfigurable multistable metasurface component of claim 13, comprising a plurality of fixed elements and comprising a set of second confinement volumes and a set of second elements disposed within the set of second confinement volumes, the set of second confinement volumes and the set of second elements being configured such that (a) in the absence of applied energy to the set of second elements, the second elements maintain first mechanically stable states within their respective second confinement volumes or maintain second mechanically stable states within their respective second confinement volumes; and (b) application of an energy reversibly encourages the set of second elements from the second mechanically stable states or the second mechanically stable states to the other mechanically stable state, and wherein the fixed elements are positioned such that a spatial relationship between a first element and a fixed element is changed when the first element is at one of its first mechanically stable state within its confinement volume or its second mechanically stable state within its confinement volume so as to give rise to a plurality of dimers, each dimer comprising a first element and a fixed element, or wherein the fixed elements are positioned such that a spatial relationship between a second element and a fixed element is changed when the second element is at one of its first mechanically stable state within its confinement volume or its second mechanically stable state within its confinement volume so as to give rise to a plurality of dimers, each dimer comprising a second element and a fixed element.

17. A reconfigurable multistable metasurface component, comprising:

a first plurality of elements disposed within a first confinement volume so as to form a first multimer that comprises the first plurality of elements in register with one another;

a second plurality of elements disposed within a second confinement volume so as to form a second multimer that comprises the second plurality of elements in register with one another; and the first confinement volume and the first element are configured such that:

(a) in the absence of applied energy to the first plurality of elements, the first plurality of elements maintains the first multimer in a first mechanically stable state within the first confinement volume; and (b) application of an energy reversibly encourages at least one of the first plurality of elements within the first confinement volume so as to remove that at least one element from the first multimer, wherein a state refers to at least one of a positional state and a rotational state.

18. A reconfigurable multistable metasurface component, comprising:

a plurality of protrusions extending from a surface, each protrusion having a first concavity facing a first direction and having a second concavity facing a second direction, and the plurality of protrusions optionally being periodically arranged;

a plurality of fixed pillar resonators extending from the surface, the plurality of fixed pillar resonators optionally being periodically arranged; and a plurality of moveable elements, the plurality of moveable elements configured such that application of an external field reversibly converts the component from one of a first mechanically stable state and a second mechanically stable state to the other of the first mechanically stable state and the second mechanically stable state, wherein (a) in the first mechanically stable state, each of the plurality of moveable elements associates with the first concavity of a first protrusion such that a periodic lattice is defined by the resonators and the moveable elements; and (b) in the second mechanically stable state, each of the plurality of moveable elements associates with the second concavity of a second protrusion so as to define a multimer comprising protrusions and moveable elements in register with one another, wherein a state refers to at least one of a positional state and a rotational state.

19. The component of claim 18, wherein the protrusion defines a maximum cross-sectional dimension, wherein the moveable element defines a maximum cross-sectional dimension, and wherein the maximum cross-sectional dimension of the protrusion is greater than the maximum cross-sectional dimension of the moveable element.

20. The component of claim 18, wherein the protrusion defines a maximum cross-sectional dimension, wherein the moveable element defines a maximum cross-sectional dimension, and wherein the maximum cross-sectional dimension of the protrusion is less than the maximum cross-sectional dimension of the moveable element.

21. A reconfigurable multistable metasurface component, comprising:

a plurality of protrusions extending from a surface, each protrusion comprising a first concavity along a first direction, a second concavity opening along a second direction that is perpendicular to the first direction, a third concavity opposite the first concavity and opening along the first direction, and a fourth concavity opposite the second concavity and opening along the second direction, and the plurality of protrusions being periodically arranged; and at least one moveable resonator, the at least one moveable resonator defining a major axis and a first end and a second end lying along the major axis, the at least one moveable resonator being positioned such that application of an external field reversibly converts the component from one of a first mechanically stable state and a second mechanically stable state to the other of the first mechanically stable state and the second mechanically stable state, wherein (a) in the first mechanically stable state, the major axis of the moveable resonator lies along the first direction and the first end of the moveable resonator is associated with the third concavity of a first protrusion and the second end of the moveable resonator is associated with the first concavity of a third protrusion, and (b) in the second mechanically stable state, the major axis of the moveable resonator lies along the second direction and the first end of the moveable resonator is associated with the fourth concavity of a second protrusion and the second end of the moveable resonator is associated with the second concavity of a fourth protrusion, wherein a state refers to at least one of a positional state and a rotational state.

22. The component of claim 21, comprising a plurality of moveable resonators.

* * * * *